United States Patent [19]
Smith et al.

[11] Patent Number: 5,656,048
[45] Date of Patent: Aug. 12, 1997

[54] ELECTRICALLY REGENERABLE DIESEL PARTICULATE FILTER CARTRIDGE AND FILTER

[75] Inventors: Mark P. Smith, Lino Lakes; Ryan C. Shirk, St. Paul, both of Minn.

[73] Assignee: Minnesota Mining and Manufacturing Company, St. Paul, Minn.

[21] Appl. No.: 726,334

[22] Filed: Oct. 3, 1996

Related U.S. Application Data

[63] Continuation of Ser. No. 597,336, Feb. 6, 1996, abandoned, which is a continuation of Ser. No. 223,551, Apr. 6, 1994, abandoned.

[51] Int. Cl.$^6$ .................................................. B01D 41/00
[52] U.S. Cl. ................. 55/282; 55/523; 55/DIG. 10; 55/DIG. 30; 60/311; 95/278
[58] Field of Search ............... 55/282, 523, DIG. 10, 55/DIG. 30; 60/303, 311; 95/278, 283

[56] References Cited

U.S. PATENT DOCUMENTS

| | | | |
|---|---|---|---|
| 3,099,540 | 7/1963 | Eisler | 219/549 |
| 3,869,267 | 3/1975 | Gaylor | 55/492 |
| 3,920,428 | 11/1975 | Kinsley, Jr. | 55/528 |
| 4,181,514 | 1/1980 | Lefkowitz et al. | 55/488 |
| 4,220,625 | 9/1980 | Toh et al. | 422/180 |
| 4,264,346 | 4/1981 | Mann | 55/523 |
| 4,276,071 | 6/1981 | Outland | 55/523 |
| 4,324,572 | 4/1982 | Erdmannsdorfer et al. | 55/385 R |
| 4,376,637 | 3/1983 | Yang | 55/2 |
| 4,427,418 | 1/1984 | Kogiso et al. | 55/287 |
| 4,456,457 | 6/1984 | Nozawa et al. | 55/283 |
| 4,516,108 | 5/1985 | Buguet et al. | 338/319 |
| 4,535,589 | 8/1985 | Yoshida et al. | 60/303 |
| 4,543,113 | 9/1985 | Forester et al. | 55/378 |

(List continued on next page.)

FOREIGN PATENT DOCUMENTS

| | | |
|---|---|---|
| 0275372A1 | 7/1988 | European Pat. Off. . |
| 0358522A3 | 3/1990 | European Pat. Off. . |
| 0485974A1 | 5/1992 | European Pat. Off. . |
| 0543075A1 | 5/1993 | European Pat. Off. . |
| 121631 | 11/1959 | France . |
| 35 45 762 A1 | 7/1987 | Germany . |
| 37 31 766 A1 | 3/1989 | Germany . |
| 38 28 516 C1 | 3/1989 | Germany . |
| 38 00 723 A1 | 7/1989 | Germany . |
| 38 01 634 A1 | 8/1989 | Germany . |
| 39 10 554 A1 | 10/1989 | Germany . |
| 38 06 131 C2 | 12/1989 | Germany . |
| 38 23 205 A1 | 1/1990 | Germany . |
| 57-163112A | 10/1982 | Japan . |
| 2193656 | 2/1988 | United Kingdom . |
| WO92/00442 | 1/1992 | WIPO . |
| WO92/13635 | 8/1992 | WIPO . |
| WO92/17689 | 10/1992 | WIPO . |
| WO92/17691 | 10/1992 | WIPO . |
| WO93/00503 | 1/1993 | WIPO . |
| WO93/18841 | 9/1993 | WIPO . |

OTHER PUBLICATIONS

H.O. Hardenberg, *Urban Bus Application of a Ceramic Fiber Coil Particulate Trap*, SAE Technical Paper Series, 870011 (1987) 12-page booklet. Reprinted from SP-702-Diesel Particulates: An Update.

Hardenberg, Daudel, and Erdmansdorfer, *Experiences in the Development of Ceramic Fiber Coil Particulate Traps*, SAE Technical Paper Series 870015 (1987) 16-page booklet. Reprinted from SP-702-Diesel Particulates: An Update.

Filterate: Cartridge Sealing Systems, Bulletin No. 1795; Filterite, A Brunswick Company (no date shown).

*Primary Examiner*—C. Scott Bushey
*Attorney, Agent, or Firm*—Douglas B. Little; Gary L. Griswold; Walter N. Kirn

[57] ABSTRACT

An electrically regenerable diesel particulate filter cartridge and filter comprising an electrically, variably resistive sheet (s) or tube which, when energized, provide sufficient heat to burn off soot particulates entrapped in the filter media.

34 Claims, 15 Drawing Sheets

U.S. PATENT DOCUMENTS

| | | | |
|---|---|---|---|
| 4,576,799 | 3/1986 | Werner et al. | 422/176 |
| 4,613,350 | 9/1986 | Forester et al. | 65/2 |
| 4,744,216 | 5/1988 | Rao et al. | 60/303 |
| 4,792,662 | 12/1988 | Kitagaki et al. | 219/545 |
| 4,813,231 | 3/1989 | Bykowski | 60/274 |
| 4,940,476 | 7/1990 | Buck | 55/486 |
| 5,015,986 | 5/1991 | Uchida et al. | 338/22 R |
| 5,042,249 | 8/1991 | Erdmannsdoerfer | 60/299 |
| 5,171,341 | 12/1992 | Merry | 55/484 |
| 5,174,968 | 12/1992 | Whittenberger | 422/174 |
| 5,174,969 | 12/1992 | Fischer et al. | 422/180 |
| 5,180,409 | 1/1993 | Fischer | 55/486 |
| 5,224,973 | 7/1993 | Hoppenstedt et al. | 55/267 |
| 5,238,472 | 8/1993 | Pfister et al. | 55/282 |
| 5,248,481 | 9/1993 | Bloom et al. | 422/171 |
| 5,248,482 | 9/1993 | Bloom | 422/174 |
| 5,258,164 | 11/1993 | Bloom et al. | 422/174 |
| 5,293,742 | 3/1994 | Gillingham et al. | 60/288 |
| 5,409,669 | 4/1995 | Smith et al. | 55/DIG. 10 |

ELECTRICALLY REGENERABLE DIESEL PARTICULATE FILTER CARTRIDGE AND FILTER

This application is a continuation of Application Ser. No. 08/597,336, filed Feb. 6, 1996, now abandoned, which is a continuation of Application Ser. No. 08/223,551, filed Apr. 6, 1994, now abandoned.

FIELD OF THE INVENTION

This invention relates to electrically regenerable diesel particulate filter cartridges and filters,

DESCRIPTION OF THE RELATED ART

Diesel engines emit a hazardous, sooty exhaust gas that can be rendered less hazardous by using diesel particulate filters which remove at least a portion of the soot from exhaust gas. The soot trapped by such filters builds up over time, requiring periodic regeneration (i.e., removal of the entrapped soot).

There are several techniques known in the art for regenerating diesel particulate filters. One technique involves the use of a gas burner to periodically burn entrapped soot from the filter media.

A second technique involves the use of catalytic materials coated onto the filter media. A third technique employs fuel having catalytic additives that lower the oxidation temperature of the soot.

A fourth technique utilizes electrical heating elements in contact with the filtering media (see e.g., U.S. Pat. Nos. 5,258,164 (Bloom et al.), 5,049,669 (Smith et al.), and 5,224,973 (Hoppenstedt), European Pat. Appl. No. 0 543 075 A1, published, May 26, 1993. Further, tubular electrical heating element configurations known to be useful for regenerating diesel particulate filter cartridges include tubes formed from expanded metal (see, e.g., FIG. 1) and slotted sheet material (see, e.g., FIG. 2). A problem associated with such tubular configurations is that as a result of temperature cycling and the corresponding thermal expansions and contractions circumferential stresses buildup leading to radial buckling of the heating element.

Such buckling produces stress concentrations in the heating element which provide initiation points for cracks; penetration of the heating element into the filter media which may damage or interfere with the filtering function; or separation of portions of the heating element from the filter media. Further, such a heating element may buckle radially upon itself, causing the heating element to short circuit. Although this problem is addressed by the invention described in U.S. Pat. No. 5,409,669 (Smith et al.), further solutions are desired. An example of a slotted electrically resistive sheet used in the Smith et al. application to provide a heating element is shown in FIGS. 3 and 6.

Another problem associated with known tubular diesel particulate filter heating elements is nonuniform heat dissipation throughout the filter media, undesirable localized hot-zones in the heater element, and decreased soot combustion due to loss of heat conduction transfer to the soot particles, and higher convection heat transfer at the center region of the filter cartridge compared to such heat transfer at the end region of the cartridge.

Moreover, known electrical diesel filter heaters do not vary the electrically converted heat energy over the length of the filter. In other words, such heaters have a constant watt density of heat over the length of the heater which lead to, when the heater is covered with filter media, a center "hot-zone" that is significantly hotter than the ends of the heater. To further illustrate this effect, see FIG. 4, which shows diesel particulate filter cartridge 400 having conventional electrical heater 401 and filter media 402. During regeneration of filter cartridge 400, nonuniform heating along the length of the filter cartridge causes burnout of entrapped soot particles in region 403, but not in regions 404. This non-uniform temperature distribution is believed to be due to loss of heat through the end of the diesel filter and the route of the passing exhaust flow.

This non-uniform temperature distribution can lead to several problems such as:

(1) incomplete combustion of soot collected in the filter media if the ends of the filter do not reach the combustion temperature of the diesel soot;

(2) undesired high temperatures in the "hot-zone" that may reach the melting point of the material from which the heater is made; and (3) undesired high temperatures in the "hot-zone" that may fuse ash to the filtering media.

SUMMARY OF THE INVENTION

The present invention provides a first diesel particulate filter cartridge comprising:

(a) a substantially rigid, electrically resistive tube having an outer surface, a first end, a second end, openings extending from the outer surface to an inner surface, and a length extending from the ends of the electrically resistive tube; wherein the electrically resistive tube has a first, a second, and a third resistive zone between the ends of the electrically resistive tube; wherein each zone has a length equal to one third of the length of the electrically resistive tube; wherein the second zone is positioned between the first and third zones; wherein when a voltage is applied across the first and second ends of the electrically resistive tube, a quantity of heat is generated in each zone; and wherein the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone;

(b) a filtering element comprising inorganic fiber covering the openings of the electrically resistive tube; and (c) means for applying a voltage across the ends of the electrically resistive tube to heat it above the combustion point of entrapped diesel exhaust particulate, the electrically resistive tube being positioned such that when a voltage is applied across the electrically resistive tube, sufficient heat is transferred from the electrically resistive tube to soot particles entrapped in the filtering element such that the soot particles burn off. In one embodiment, the electrically resistive tube has strands present between openings, wherein at least one of (i) the average width of the strands in each of the first and third electrically resistive zones is less than the average width of the strands in the second electrically resistive zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, (ii) the number of current paths along the length of each of the first and third zones is greater than the number of current paths along the length of the second zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, or (iii) the average current path length along the length of each of the first and third zones is greater than the average current path length along the length of the second zone such that the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone.

In another aspect, the present invention provides a second diesel particulate filter cartridge comprising:

(a) a substantially rigid, hollow tubular support member having two ends and an outer surface with openings extending from the outer surface to an inner surface;

(b) a first filtering element comprising inorganic fiber covering the openings;

(c) an electrically resistive sheet (preferably, a plurality of electrically resistive sheets, more preferably two or three electrically resistive sheets) having an outer surface, a first end, a second end, openings extending from the outer surface to an inner surface, and a length extending from the ends of the electrically resistive sheet; wherein the electrically resistive sheet has a first, a second, and a third resistive zone between the ends of the electrically resistive sheet; wherein each zone has a length equal to one third of the length of the electrically resistive sheet; wherein the second zone is positioned between the first and third zones; wherein when a voltage is applied across the ends of the electrically resistive sheet, a quantity of heat is generated in each zone; and wherein the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone; and (d) means for applying a voltage to the ends of the electrically resistive sheet such that a voltage is applied across the electrically resistive sheet sufficient to heat it above the combustion point of entrapped diesel exhaust particulate, the electrically resistive sheet being positioned such that when a voltage is applied across the electrically resistive sheet, sufficient heat is transferred from the sheet to soot particles entrapped in the filtering element such that the soot particles burn off. In one embodiment, the electrically resistive sheet(s) has strands present between openings, wherein at least one of (i) the average width of the strands in each of the first and third electrically resistive zones is less than the average width of the strands in the second electrically resistive zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, (ii) the number of current paths along the length of each of the first and third zones is greater than the number of current paths along the length of the second zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, or (iii) the average current path length along the length of each of the first and third zones is greater than the average current path length along the length of the second zone such that the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone.

The electrically resistive sheet(s) are preferably positioned to allow for circumferential expansion of the sheet(s). The electrically resistive sheets can be positioned, for example, to provide sufficient space between the sides of the sheet(s) such that when the sheet(s) expand during heating, the sides can expand circumferentially without expanding into each other, which may lead to radial buckling. Further, if the sheet(s) extends over 100% of the circumference of the first filter element, the sheet(s) can be positioned to allow overlapping portions of the sheet(s) to slide past one another.

In yet another aspect, the present invention provides a third diesel particulate filter cartridge comprising:

(a) a substantially rigid, hollow, tubular support member having an outer surface, two ends, and openings extending from the outer surface to an inner surface;

(b) a filtering element comprising inorganic fiber covering the openings of the support member, the filter element having an exterior surface;

(c) an electrically resistive tube having an outer surface, a first end, a second end, openings extending from the outer surface to an inner surface, and a length extending from the ends of the electrically resistive tube; wherein the electrically resistive tube has a first, a second, and a third resistive zone between the ends of the electrically resistive tube; wherein each zone has a length equal to one third of the length of the electrically resistive tube; wherein the second zone is positioned between the first and third zones; wherein when a voltage is applied across the ends of the electrically resistive tube, a quantity of heat is generated in each zone; and wherein the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone; and (d) means for applying a voltage across the electrically resistive tube to heat it above the combustion point of entrapped diesel exhaust particulate, the electrically resistive tube being positioned such that when a voltage is applied across the electrically resistive tube, sufficient heat is transferred from the electrically resistive tube soot particles entrapped in the filtering element such that the soot particles burn off. In one embodiment, the electrically resistive tube has strands present between openings, wherein at least one of (i) the average width of the strands in each of the first and third electrically resistive zones is less than the average width of the strands in the second electrically resistive zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, (ii) the number of current paths along the length of each of the first and third zones is greater than the number of current paths along the length of the second zone such that the quantity of heat generated in each of the first and the third electrically resistive zones is greater (typically at least 5 percent, preferably, at least 10 percent, more preferably, at least 15 percent, even more preferably, at least 30 percent, and most preferably, at least 45 percent) than the quantity of heat generated in the second zone, or (iii) the average current path length along the length of each of the first and third zones is greater the average current path length along the length of the second zone such that the quantity of heat generated in each of the first and third zones is greater (typically at least 5 percent, preferably, at least 10 percent, more preferably, at least 15 percent, even more preferably, at least 30 percent, and most preferably, at least 45 percent) than the quantity of heat generated in the second zone.

For the second and third diesel particulate filters according to the present invention, if the support member is electrically conductive, the support member and electrically resistive sheet(s) or tube are preferably electrically insulated from each other.

A preferred embodiment of the second and third filter cartridges comprises a second filter element comprising inorganic fiber covering the openings of the electrically resistive sheet(s) or electrically resistive tube.

In other embodiments according to the present invention, which may include those described above, the electrically resistive tube or sheet can have a first, a second, a third, a fourth, and a fifth resistive zone between the ends of the electrically resistive tube or sheet; wherein each zone has a length equal to one fifth of the length of the electrically resistive tube or sheet; wherein the second zone is positioned between the first and third zones, the third zone positioned between the second and fourth zones, and the fourth zone positioned between the third and fifth zones; wherein when a voltage is applied across the ends of the electrically resistive tube or sheet, a quantity of heat is generated in each zone; and wherein the quantity of heat generated in each of the second and fourth zones (preferably, each of the first, second, fourth, and fifth zones) is greater (preferably, at least 5 percent, more preferably, at least 10 percent, even more preferably, at least 15 percent, at least 30 percent, and even at least 45 percent) than the quantity of heat generated in the third zone. In one embodiment, the electrically resistive tube or sheet has strands present between openings, wherein at least one of (i) the average width of the strands in each of the second and fourth resistive zones is less than the average width of the strands in the third electrically resistive zone such that the quantity of heat generated in each of the second and the fourth electrically resistive zones is greater (typically at least 5 percent, preferably, at least 10 percent, more preferably, at least 15 percent, even more preferably, at least 30 percent, and most preferably, at least 45 percent) than the quantity of heat generated in the third zone, (ii) the number of current paths along the length of each of the second and fourth zones is greater than the number of current paths along the length of the second zone such that the quantity of heat generated in each of the second and the fourth electrically resistive zones is greater (typically at least 5 percent, preferably, at least 10 percent, more preferably, at least 15 percent, even more preferably, at least 30 percent, and most preferably, at least 45 percent) than the quantity of heat generated in the third zone, or (iii) the average current path length along the length of each of the first and fifth zones is greater than the average current path length along the length of each of the second and fourth zones such that the quantity of heat generated in each of the first and fifth zones is greater (typically at least 5 percent, preferably, at least 10 percent, more preferably, at least 15 percent, even more preferably, at least 30 percent, and most preferably, at least 45 percent) than the quantity of heat generated in each of the second and fourth zones.

Preferably, a filter cartridge according to the present invention further comprises means for supporting the cartridge in a casing.

Preferably, a filtering cartridge according to the present invention further comprises means for forcing exhaust gases to flow through the openings of the support member and the electrically resistive sheet(s) or tube.

In another aspect, the present invention provides a diesel particulate filter or trap comprising (a) a casing having at least two ends;
(b) means for connecting the at least two ends of the casing to an exhaust system;
(c) means for supporting at least one diesel particulate filter cartridge; and
(d) at least one filter cartridge according to the present invention comprising means for supporting the cartridge in a casing, wherein the two ends of the electrically resistive tube or support member extend between the two ends of the casing and being supported in the casing by the supporting means.

To provide more efficient heat transfer, at least one face of the electrically resistive sheet(s) or tube is preferably in intimate contact with the filter element. If the electrically resistive sheet(s) or tube is buried in the filter element, preferably substantially the entire area of each major surface of the electrically resistive sheet(s) or tube (i.e., the inner and outer surfaces) is in contact with the filter element. Further, the heat-insulating nature of the filtering element tends to confine the heat and reduce heat radiation losses from the heater, minimizing the energy required to burn off the entrapped soot particles.

Preferably, the electrically resistive sheet(s) or tube is positioned such that it is located near the region of maximum soot collection.

In this application:

"substantially rigid" as used herein means the tube or support member is self supporting and is capable of supporting the filter media covering the outer surface thereof;

"hot-zone" as used herein refers to the center portion of an electrical filter that operates at a higher temperature than the ends of the filter;

"strand" with regard to the heating element refers to a solid strip of material having two opposite sides, wherein each opposite point along the two opposite sides are typically parallel; for example, a strand in the heating element configuration 220 depicted in FIG. 2 is represented by shaded area 221; a strand in the heating element configuration 230 depicted in FIG. 3 is represented by shaded area 231; a strand in the heating element configuration 250 depicted in FIG. 5 is represented by shaded area 251;

"current path length" as used herein refers to the shortest electrical current path between two points; for example, the current path across the length of a tube formed from the configuration depicted in FIG. 5, wherein the length of the tube is in the x-direction, is shown by line 255; further, the circumferential current path length of a tube formed from the configuration depicted in FIG. 5 is shown by line 256;

"buckling" as used herein refers to a sudden, significant deformation of a structure resulting from a slight increase of an existing load under which the structure had exhibited little, if any, deformation prior to increasing the load; for example, a yardstick placed on end is typically able to support a load of several kilograms without significant lateral deformation, but if the load is increased until the yardstick bows out slightly, any further increase in the load will result in large lateral deflections; more specifically, buckling occurs when the load applied, $P_{APP}$, to a strand of a heating element is greater than the critical load, $P_{Cr}$, wherein the critical load is defined by $$P_{Cr} = \frac{\Pi^2 E b t^3}{3 l^2},$$

wherein

E is the Young's modulus of the strand material;

b is the width of the strand;

t is the thickness of the strand; and l is the length of the strand before a load is applied;

"inorganic fiber" refers to any inorganic-based fiber which is resistant to high temperature (e.g., temperatures above about 600° C.), is chemically resistant to diesel exhaust gas, and has textile qualities (i.e., is suitable for the winding, weaving, etc., required to make a filter element);

"yarn" means a plurality or bundle of individual fibers or filaments;

"heat-fugitive fiber" refers to a fiber comprising constituents which decompose and volatilize when heated (e.g., organic material); and "fiber segment" refers to the portion of a broken fiber protruding from the core of the yarn.

The present invention provides an efficient, economical means for regenerating (i.e., burning out the collected soot) a diesel particulate filter cartridge. Preferred electrical heating elements employed in diesel particulate filter cartridges according to the present invention provide a solution to the "hot-zone" problem associated with known electrical diesel particulate filter heating elements.

BRIEF DESCRIPTION OF THE DRAWING

The invention may be more easily understood in reference to the drawing. In the drawing.

DESCRIPTION OF THE PREFERRED EMBODIMENTS

Figure 7:
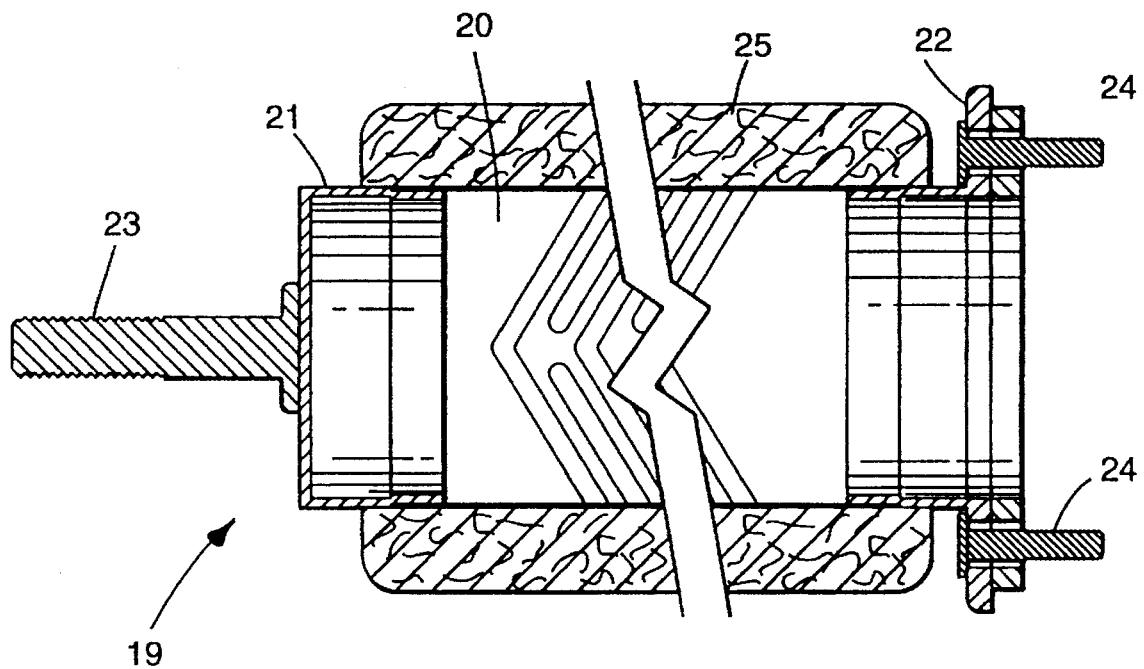
FIG. 7 is a longitudinal cross-section of a preferred first diesel particulate filter cartridge according to this invention.

Referring to FIG. 7, a preferred diesel particulate filter cartridge according to the present invention 19 comprises slotted electrically resistive tube 20 having welded circular metal cap 21 and metal annular ring 22. Threaded metal post 23 is welded to circular metal cap 21. Welded to metal annular ring 22 are four metal mounting studs 24. Threaded metal post 23 is connected to a conventional switch (not shown) which is in turn connected to a conventional power source (not shown). Metal mounting studs 24 provide an electrical ground for the circuit. Filter media 25 comprises inorganic yarn that is substantially helically cross-wound around slotted electrically resistive tube 20.

Figure 8:
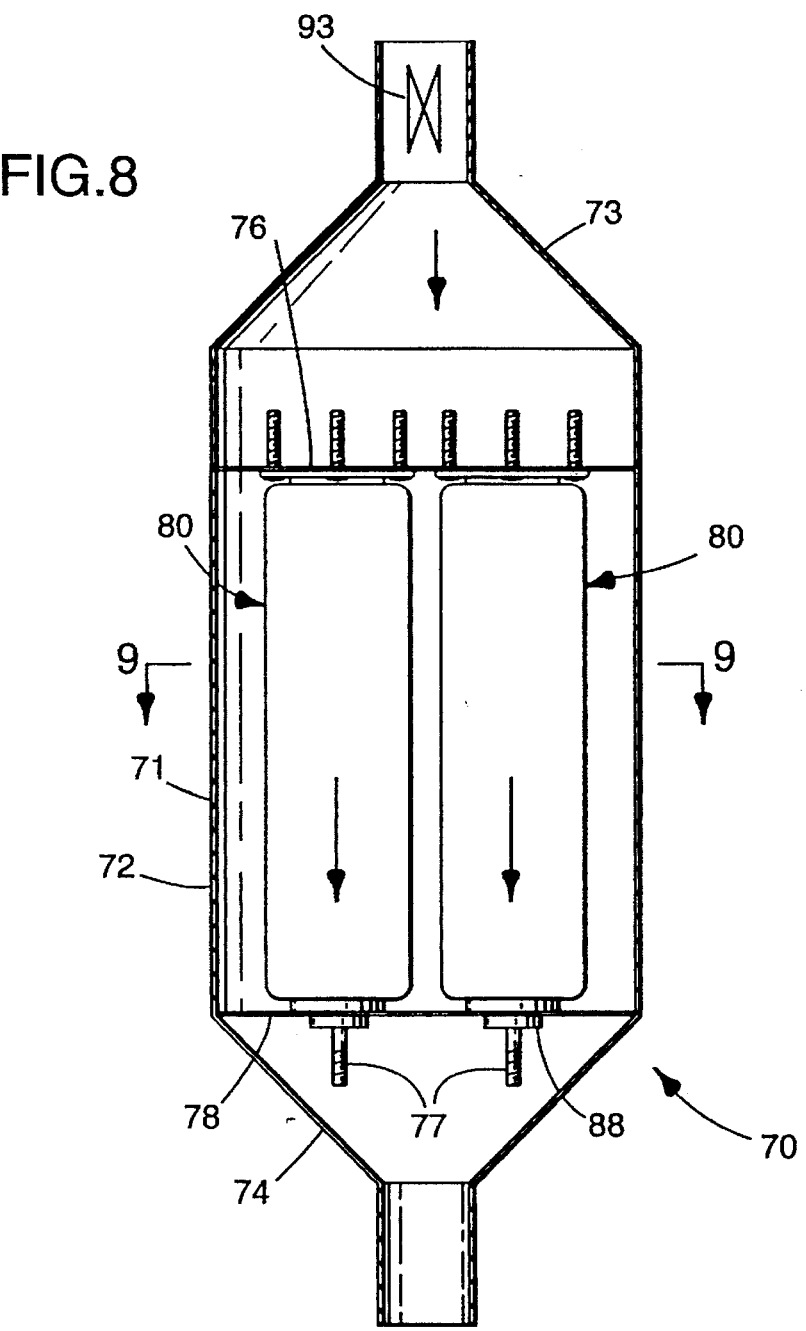
FIG. 8 is a longitudinal cross-section of a diesel particulate filter or trap consisting of four of the filter cartridges shown in FIG. 7.
Figure 9:
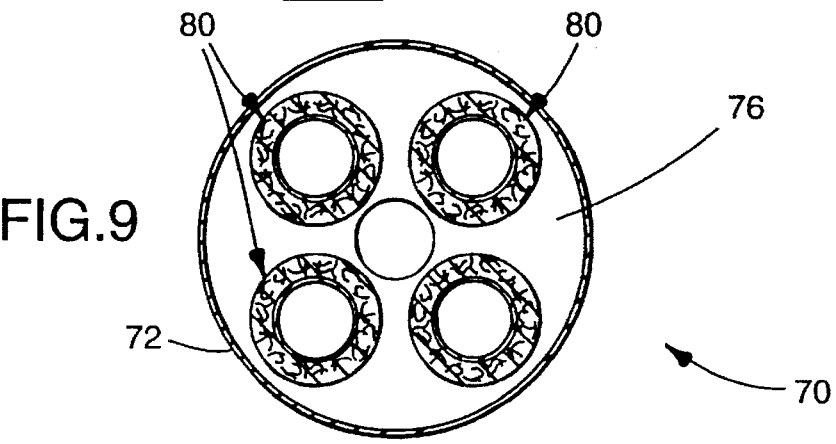
FIG. 9 is a cross-section along line 9—9 of FIG. 8.

A preferred diesel particulate filter or trap according to the present invention is shown in FIGS. 8 and 9. Diesel particulate filter or trap 70 comprises elongated casing 71 having cylindrical body 72, conical exhaust inlet 73, and conical exhaust outlet 74. Within cylindrical body 72, and extending between the inlet and outlet ends, are four spaced, substantially parallel diesel particulate filter cartridges according to the present invention 80. Each filter cartridge 80 is mounted to circular metal plate 76 which has a circular opening to allow exhaust gas to pass radially inward and exit outwardly through filter cartridge 80 and exit filter 70 through conical exhaust outlet 74. Threaded metal post 77 supported by open support structure 78 is insulated from open support structure 78 by ceramic insulator 88. Metal valve 93 is positioned in conical inlet 73 to divert exhaust gas flow from filter cartridge 80 during regeneration, thereby reducing the power requirements.

To minimize the amount of electrical power expended at any instant in time, a diesel particulate trap comprising a plurality of filter cartridges preferably includes means for independently energizing each of the electrically resistive tubes at different times (e.g., sequentially).

Figure 10:
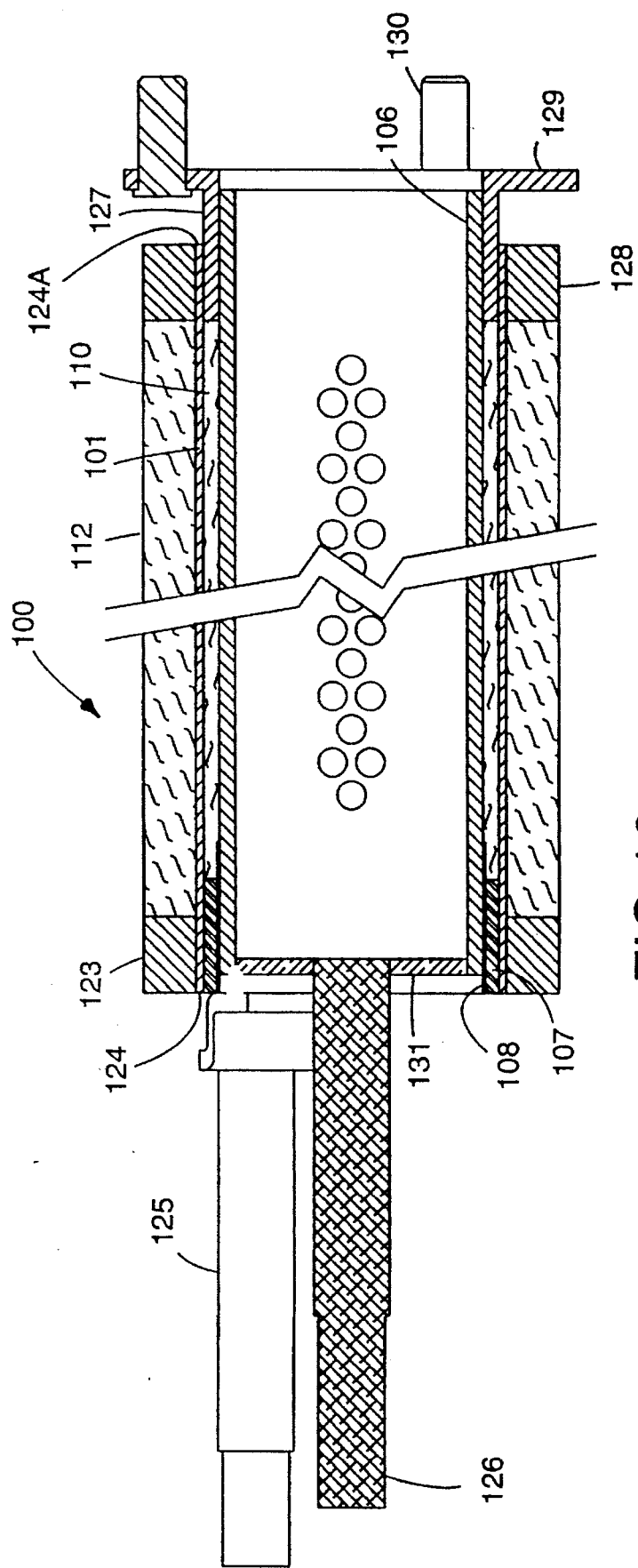
FIG. 10 is a longitudinal cross-section of another diesel particulate filter cartridge according to this invention.

Referring to FIG. 10, preferred diesel particulate filter cartridge according to the present invention 100 comprises tubular support member 106 having an outer surface with openings extending from the outer surface to an inner surface covered by inner filtering element 110 which is in turn covered by slotted electrically resistive sheet(s) or tube 101, which in turn is covered by outer filtering element 112.

Tubular support member 106 electrically insulated from inner metal ring 107 by aluminoborosilicate ceramic oxide fiber sleeving 108 (commercially available, for example, under trade designation "NEXTEL 2 INCH BRAIDED SLEEVING WITH 170 SIZING" from the 3M Company of St. Paul, Minn.).

End 124 of slotted electrical sheet(s) or tube 101 is clamped between inner metal ring 107 and outer metal ring 123, which is electrically connected to electrical post 125. Electrical post 125 can be connected to a conventional power source (not shown). Center threaded post 126 is welded to metal end cap 131 Which is welded to tubular support member 106. Center threaded post 126 can be used to support an end of filter cartridge 100 in a casing.

The open end of tubular support member 106 fits inside annular collar 127 and is welded. End 124A of slotted electrical sheet(s) or tube 101 is clamped between annular collar 127 and outer ring 128. Annular collar 127 is welded to circular metal flange 129 which has a circular opening to allow exhaust gas to pass radially inward and exit outwardly through filter cartridge 100. Circular metal flange 129 has press-fit or welded mounting studs 130 to attach to casing.

The casing, plates, and posts can independently comprise any suitable material including, for example, metals or ceramics, although metal is preferred, for example, if the casing, plate, or post is to serve as an electrical conductor. Further, for ease of manufacture, the preferred material is a metal. Preferably, the metal is stainless steel. Means for connecting the casing, plates, and posts include those known in the art for the particular material of which the casing, plates, and posts are comprised. For example, if the casing, plates, and posts are made of metal, the preferred means for connecting them is welding.

The shape of the casing can vary by convenience. Suitable shapes include those having a circular cross-section, an elliptical cross-section, a square cross-section, and a rectangular cross-section. The casing typically is elongated to allow it to have a slim profile.

The hollow support member can comprise any suitable material including, for example, metals and ceramics. The hollow support member can be, for example, a tube with holes, a wire screen, or an expanded metal, provided it is substantially rigid. Preferably, the hollow support member comprises a metal. More preferably, the metal is a high temperature metal (i.e., substantially maintains its physical properties at temperatures above about 600° C.) such as a nickel-chrome-iron alloy (including those commercially available under the trademarked designations "INCONEL 600" and "INCOLOY 800" from Inco Alloy International, Inc. of Huntington, W. Va., "HAYNES 556" from Haynes International of Kokomo, Ind., and "KANTHAL A1" from The Kanthal Corp. of Bethel, Conn.).

The shape of the hollow, tubular support member can vary by convenience, as described above for the casing. Preferably, the hollow support member has a circular or elliptical cross-section.

The openings in the hollow support member should be as large as possible while maintaining rigidity. Preferably, each opening is of a diameter in the range from about 1 to about 20 mm. More preferably, each opening is of a diameter in the range from about 2 to about 10 mm, and most preferably in the range from about 3 to about 7 mm.

The size of individual openings may be the same, different, or a combination thereof.

Preferably, the openings occupy in the range from about 40 to about 80 percent of the total projected area of the hollow support member. More preferably, the openings occupy in the range from about 50 to about 70 percent of the total projected area of the hollow support member. An open area substantially above 80 percent may significantly affect the structural integrity of the hollow support member. On the other hand, an open area substantially below 40 percent may cause undesirably high back pressures during use.

The openings are preferably uniformly distributed over the surface of each hollow support member, except the ends of the support member which are preferably imperforate.

The filter element or media comprising the inorganic fiber or yarn can be in any shape useful for trapping diesel particulate soot. Suitable filtering elements or media include inorganic fiber or yarn helically wound around the hollow support member or the electrically resistive tube; woven fabric, nonwoven mats, or combinations thereof.

The inorganic fibers or yarn are preferably ceramic. The ceramic fibers or yarn can be, for example, amorphous (including glass), polycrystalline, or a combination thereof. Useful ceramic fibers or yarns are known in the art for such purposes and include those comprising aluminoborosilicate, aluminum oxide, silicon dioxide, or silicon carbide.

The filtering element configuration is preferably selected to allow a high degree of filtering efficiency without significant back pressure.

Wound Inorganic Yarn

Preferably, the inorganic yarn helically wound around the hollow support member has a diameter in the range from about 0.5 to about 5 mm. More preferably, the diameter is in the range from about 1 to about 3 mm. Yarn diameters in the specified ranges typically have superior textile qualities as compared to yarns with diameters outside of these ranges. Such yarns typically comprise in the range from about 780 to about 7800 individual inorganic fibers. Preferably, the inorganic yarn comprises in the range from about 1560 to about 4680 individual fibers. The inorganic yarn can be ply-twisted.

The inorganic fibers preferably have a diameter in the range from about 5 to about 20 micrometers. More preferably, the inorganic fibers have a diameter in the range from about 7 to about 15 micrometers, and most preferably, in the range from about 9 to about 14 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken when texturized).

Useful ceramic yarns include those comprising fibers made of aluminoborosilicate, aluminum oxide, silicon dioxide, or silicon carbide. Preferably, the ceramic fiber comprises an aluminoborosilicate. To aid in handling, the yarns are preferably sized using conventional sizing techniques. Aluminoborosilicate fibers are commercially available, for example, under the trademarked designations "NEXTEL 312 CERAMIC YARN" and "NEXTEL 440 CERAMIC YARN" from the 3M Company of St. Paul, Minn.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique.

Preferably, the texturized inorganic yarn has a diameter in the range from about 1 to about 10 mm. More preferably, the diameter of the texturized inorganic yarn is in the range from about 3 to about 6 mm. The filtering or trapping efficiency of texturized yarn having a diameter in the specified ranges is generally superior to such yarns having diameters outside of these ranges.

For enhanced filtering efficiency, the inorganic yarn is preferably substantially helically cross-wound around the support member or electrically resistive tube. More preferably, the yarn is substantially helically cross-wound around the support member or electrically resistive tube to form four-sided openings.

Preferably, the inorganic yarn comprises a dense core from which a plurality of loops of continuous fibers, fiber segments or a combination thereof extend outwardly, wherein the cores of successive convolutions of each successive layer are radially aligned to provide relatively dense walls that are spaced to define four-sided openings, and wherein the loops of fibers and/or the fiber segments project into each of the four-sided openings, with loops of fibers and/or fiber segments of adjacent convolutions being intermeshed to provide with each of the four-sided openings a trap for diesel exhaust particulates.

Figure 11:
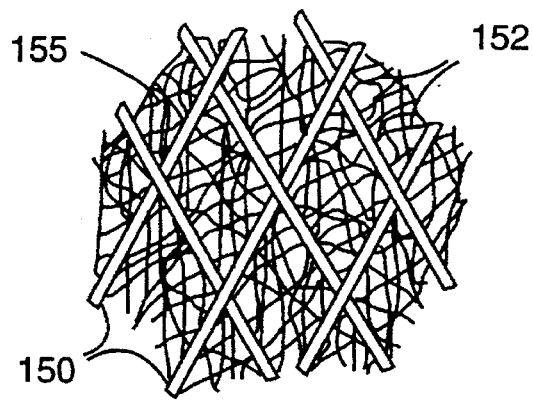
FIG. 11 shows a portion of the surface of a filtering element, greatly enlarged.
Figure 12:
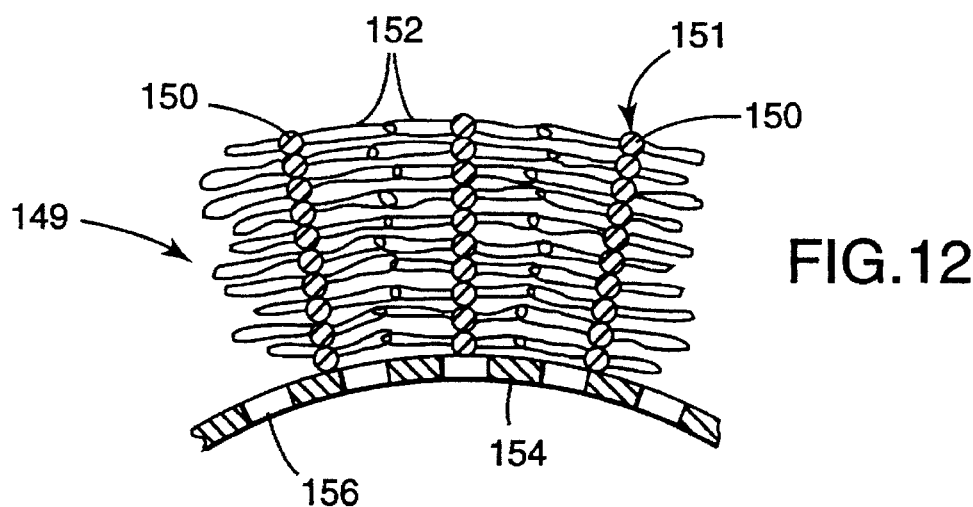
FIG. 12 is a cross-section of a four-sided filtering element, greatly enlarged.

Referring to FIGS. 11 and 12, four-sided filter element 149 has helically cross-wound inorganic yarn comprising ceramic yarn having dense core 150 from which fiber segments, loops of continuous fibers, or combinations thereof 152 protrude outwardly. FIGS. 11 and 12 show yarn which is cross-wound in layers, initially at an angle of about 45° to the axis of hollow support member 154 or electrically resistive tube (having openings 156) in each winding direction. To form the four-sided openings, the winding angle of each successive layer (i.e., one complete covering of the hollow support member before the four-sided pattern repeats) of yarn is slightly increased (i.e., about 0.25°) such that the core of the yarn is radially aligned with the underlying core. This winding arrangement results in adjacent convolutions being widely spaced in the first pass and then interspersed with subsequent convolutions until the spacings between adjacent convolutions are uniform. This arrangement inherently results in the interweaving of oppositely directed convolutions in each of the layers providing stabilization to the filtering element against exhaust forces.

The radially aligned cores wrapped around the hollow support member or electrically resistive tube collectively form relatively dense walls 151 which are spaced to define four-sided openings 155 (i.e., diamond-shaped). Fiber segments, fiber loops, or combinations thereof 152 project into each of four-sided openings 155, with fiber segments and fiber loops of laterally adjacent convolutions being intermeshed as shown in FIG. 12.

As the windings extend into the imperforate areas, the winding angle is preferably changed under computer control so that adjacent convolutions of the yarn are progressively brought more closely together to provide relatively thick walls that are substantially impervious to the flow of exhaust.

Because each of walls 151 extend radially, four-sided openings 155 are funnel-shaped as viewed in FIG. 12. Further, the density of fiber segments and fiber loops tend to increase from the outer face to the base of each opening, providing a distribution of particulate traps over the full depth of the filtering element, when the exhaust flows radially inwardly through the filtering element. The filtering capability of the filter element can be enhanced by using higher textured yarn in the downstream portion and using progressively less texturized yarn in the portions further upstream.

Preferably, cores of convolutions of at least one layer are laterally offset from cores of convolutions of an adjacent layer to deflect the generally radial exhaust flow into tortuous paths. More preferably, the filtering element comprises at least 4 layers of yarn (preferably, 10 to 30 layers) and the cores of convolutions of at least 3 layers (preferably, 5 to 15 layers) laterally offset from cores of convolutions of the underlying layer. Further, cores of convolutions of adjacent offset layers are preferably more closely spaced from each other than are cores of convolutions of the same layer. Closer spacings afford better support to the fiber segments, thus reducing damage and also enabling each fiber segment to support a greater density of soot, advantages that can be attained while keeping back pressures satisfactorily low. In contrast, when all cores of successive convolutions are radially aligned with the cores of underlying convolutions, any reduction in spacing between cores increases the back pressure.

Figure 13:
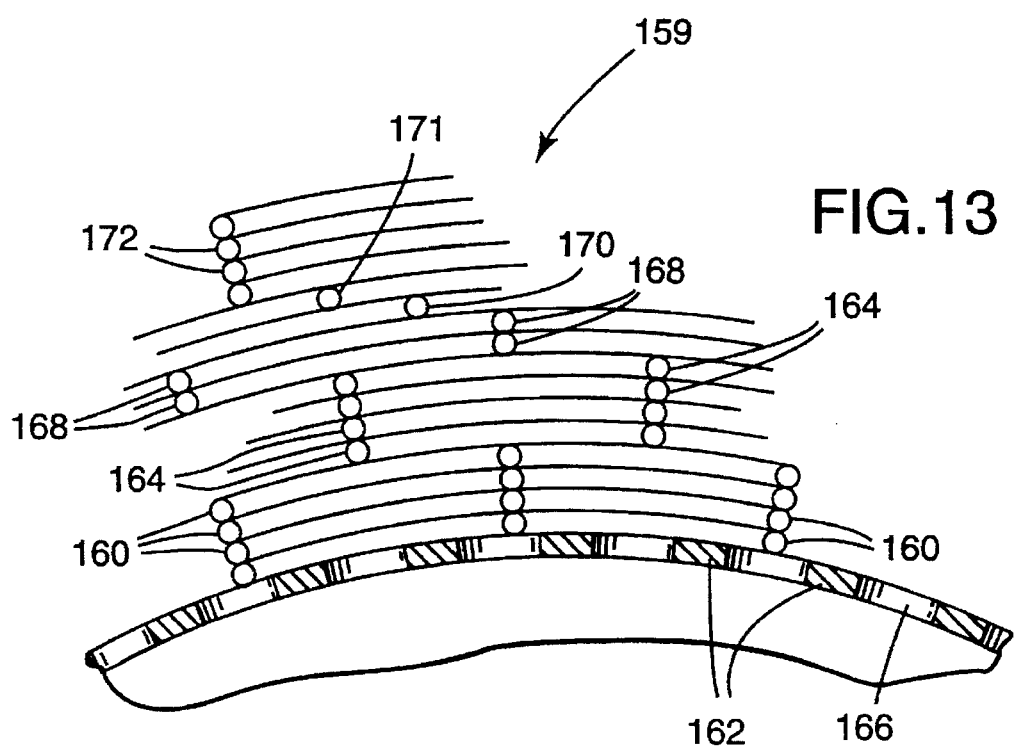
FIG. 13 is a cross-section of a four-sided filter element having laterally offset cross-wound wraps, greatly enlarged.

Referring to FIG. 13, four-sided filter element 159 having laterally offset cross-wound wraps has cores of each successive convolution of first four layers 160 of untexturized yarn tightly wound against and radially aligned with the core of an underlying convolution. The radially aligned cores together form spaced walls defining a first set of four-sided openings that are funnel-shaped as viewed in FIG. 13.

By rotating the mandrel 23° before applying a second set of four layers 164 of texturized yarn, their cores of radially aligned convolutions bisect the four-sided openings formed by the first four layers 160, thus forming a second set of four-sided openings. After rotating the mandrel another 23° a third set of two yarn layers 168 were laid down to form a third set with four-sided openings. As seen in FIG. 13, the cores of radially aligned yarn convolutions of the third set of layers 168 bisect the second set of four-sided openings and are radially aligned with the cores of convolutions of the first set of four layers 160.

The mandrel was then rotated 11.5° before applying a single-yarn fourth layer 170 that forms a fourth set of four-sided openings. Each core of a convolution of the fourth layer 170 is laterally offset 25% of the distance across four-sided openings of the third set of layers 168.

The mandrel was again rotated 11.5° before applying a single-yarn fifth layer 171 that forms a fifth set of four-sided openings. Each core of a convolution of the fifth layer 171 bisects four-sided openings of the third set of layers 168 and is radially aligned with cores of convolutions of the second set of layers 164.

The mandrel was again rotated 11.5° before applying a sixth set of four yarn layers 172 that are radially aligned to form a sixth set of four-sided openings. Each convolution of the yarn cores of the sixth layers 172 bisects spaces between cores of convolutions of the fifth layer 171 and cores of convolution of the third set of layers 168. The resulting filtering element 159 on hollow support member or electrically resistive tube 162 having openings 166 contains sixteen layers of yarn.

When applying each successive yarn layer of the filtering element 159, the winding angle is slightly increased (e.g., about 0.25°) either to place the yarn core in radial alignment with the underlying core of the previous layer or to provide a desired lateral offset. Exhaust gas is deflected into tortuous paths by the laterally offset yarn cores of the outer five sets of layers of the filtering element 159.

As the windings for the four-sided filters extend into the imperforate areas, the winding angle is preferably changed under computer control so that adjacent convolutions of the yarn are progressively brought more closely together to provide relatively thick end walls that are substantially impervious to the flow of exhaust.

The density of fiber segments and loops of continuous fiber tend to increase from the outer face to the base of each opening, providing a distribution of particulate traps over the full depth of the filtering element. The filtering capability of the filter element can be enhanced by using higher texturized yarn in the downstream region and using progressively less texturized yarn in the regions further upstream.

Preferably, the angle at which a filtering element is wound is in the range from about 30° to about 70° to the axis of the hollow support member or electrically resistive tube in each winding direction. More preferably, the winding angle is in the range from about 30° to about 60°. Most preferably, the winding angle is in the range from about 45° to about 55°. Use of winding angles within the specified ranges typically provide a filtering element which is more efficient and is better secured to the hollow support member or electrically resistive tube than filters wound at an angle substantially outside of these ranges.

For the first cross-wound circuit (i.e., one winding pass in each direction), the four-sided openings (where they cover the open areas) are preferably of uniform size and shape.

Preferably, the opening size between opposite corners of the four-sided openings is in the range from about 3 mm to about 20 mm in each of the axial and circumferential directions of the hollow support member or electrically resistive tube. More preferably, the opening size between opposite corners of the four-sided openings is in the range from about 4 mm to about 13 mm in each of the axial and circumferential directions of the hollow support member or electrically resistive tube. Openings substantially larger than the stated ranges may provide inadequate filtering efficiency, whereas openings substantially smaller than the stated ranges may result in undesirably high back pressures.

In winding the yarn around the hollow support member or electrically resistive tube, the winding tension is preferably as high as possible, without breaking the yarn. Typically the winding tension is in the range from about 4 to about 19.6 Newtons. Preferably, the winding tension is in the range from about 4 to about 13 Newtons. Excessive winding tensions tend to produce an undesirable compaction where convolutions are supported by fiber segments of the underlying layer.

To increase the accumulation of soot near the electrically resistive sheet(s) or tube, the region of the filter element upstream from the electrically resistive sheet(s) or tube can be preferably relatively free of loops of continuous fibers and fiber segments (i.e., lightly texturized).

Each filtering element can comprise one or more layers of substantially helically wound cross-wound inorganic yarn, or it can comprise one or more nonwoven mats comprising inorganic fibers, wherein the mat is held against the radially outer surface of the support member or electrically resistive sheet(s) or tube by substantially helically wound cross-wound inorganic yarn.

For a filtering element comprising the substantially helically wound cross-wound texturized yarn comprising ceramic fibers, it may be desirable to incorporate some heat-fugitive yarn into the windings. The passageways left behind when the heat-fugitive yarn are burned away during or prior to the first use of the filter may provide both reduced back pressure and enhanced access to the filtering fibers.

Preferably, the filtering element has an annular thickness in the range from about 1 to about 25 mm. For filtering elements comprising substantially helically wound cross-wound, texturized yarn comprising inorganic fibers, the preferred total annular thickness of the wound cross-wound fibers is in the range from about 5 to about 15 mm. For a filtering element comprising substantially helically wound cross-wound texturized yarn and a nonwoven mat, the preferred annular thickness of the filtering element is in the range from about 3 to about 10 mm. Thicknesses substantially greater than the stated ranges may unduly increase cost and may also result in undesirably high back pressures, whereas thicknesses substantially smaller than the stated ranges may provide inadequate filtering efficiency.

For filters having the electrically resistive sheet(s) or tube between layers of filter media (buried heater configuration), the annular thickness of the inner filtering element should be sufficient to electrically insulate an electrically conductive hollow support member from the electrically resistive sheet (s) or tube. Typically, the annular thickness of an inner filter element is in the range from 0.25 to about 0.75 cm. Preferably, the annular thickness of an inner filter element is in the range from about 0.35 to about 0.5 cm.

Woven Fabric

Suitable woven fabrics comprising inorganic fibers or yarns are known in the art for such use and include those commercially available, for example, under the trade designation "NEXTEL CERAMIC FABRIC" from the 3M Company of St. Paul, Minn.

The fabric can be secured to the support member or electrically resistive tube by means known in the art, including wrapping fabric around the support member or electrically resistive tube and then helically winding fiber (including metal wire) or yarn around the fabric; wrapping fabric around the support member or electrically resistive sheet(s) or tube and then sewing ends of the fabric together; and forming the fabric into a tube and slipping it over the hollow support member or electrically resistive sheet(s) or tube. It is within the scope of this disclosure to place fabric over filter media provided, for example, by helically winding inorganic fiber or yarn, or wrapping a nonwoven mat(s) around the support member or electrically resistive sheet(s) or tube.

A preferred fabric is disclosed in U.S. Pat. No. 5,180,409 (Fischer), the disclosure of which is incorporated herein by reference. This preferred fabric is an unknotted weave of flexible, substantially incompressible, substantially uncrimped, spaced support strands and flexible, lofty, substantially fully crimped fill yarns that are pulled tightly against the support strands. By "substantially incompressible" it is meant that the support strands maintain their shape and diameter when the lofty fill yarns are pulled tightly against the support strands.

Preferably, the support strands of the preferred fabric are yarns that are rendered substantially incompressible by being made from a plurality of small glass or ceramic fiber ends (preferably from 3 to 8 ends/bundle and from 300 to 1600 fibers/end) that are uniformly twisted together, preferably having from 0.4 to 3 twists/cm, after which a plurality of those intertwisted bundles (preferably from 2 to 6) are twisted together in the opposite direction at the same number of twists/cm.

By "crimp" it is meant the generally sinuous form taken up by a yarn during the weaving action of producing a fabric. Further with regard to the preferred fabric, the term "lofty" refers to a yarn which, when unstressed, has a void volume of at least 75%. The void volume of a yarn can be calculated by using a graduated microscope to measure the nominal diameter (D) and a scale to measure the mass (M) of a length (L) of the yarn. The void volume (VV) is then obtained from the following equation:

$$VV = 1 - \frac{M/\rho}{\pi L D^2/4},$$

wherein $\rho$ is the bulk density of the yarn.

The D of a texturized yarn is the diameter of a cylindrical envelope to which the loops extend, which envelope bridges any valleys at the surface of the yarn and so encompasses voids at those surfaces.

To enhance texturizing, individual ends of the fill yarns should not be highly twisted, i.e., they preferably have less than 2 twists/m, and the ends should not be tightly twisted together, i.e, preferably having no more than one twist/cm. When the ends are twisted together, texturizing also is enhanced by employing only a few ends per yarn, preferably two or three.

For optimum filtering efficiency, while keeping back pressures low, the fill yarns should be texturized to a void volume of at least 85%, more preferably, at least 95%. To keep back pressures low, the fill yarns preferably are spaced from each other, but the outermost fibers of highly texturized fill yarns can be intermeshed without appreciably increasing back pressures. When the fill yarns are not intermeshed, a filter should employ multiple layers of the novel fabric.

For convenience of manufacture, the support strands preferably are the warp, and the fill yarns are the weft of the novel fabric and are pulled tightly against the support strands during the weaving process. By being pulled tightly against the support strands, the fill yarn is flattened where it contacts a support strand, thus helping to prevent the fill yarn from slipping or shifting, especially when the fill yarn is flattened at each support strand to a thickness less than one-fifth its nominal diameter. For better assurance against slippage, the flattening should be from 1/10 to 1/20 of the nominal diameter of the fill yarn. Even when so flattened, intervening portions of the fill yarn retain their lofty character.

Where a filter requires significant thicknesses, i.e., multiple layers of the novel fabric, this can be achieved at greater economy when the novel filtering fabric is a multi-warp fabric.

If the filter element includes multiple layers of the preferred fabric, the support strands of adjacent layers preferably extend orthogonally to each other to minimize nesting. When two or more layers of the fabric are used as the filter media, the support strands of the innermost layer preferably extend in the circumferential direction, thus making it easier to pull that layer snugly against the substrate.

Nonwoven Mats

Typically, the fibers comprising the nonwoven mat have a diameter up to about 20 micrometers. Preferably, the fibers comprising the nonwoven mat have a diameter in the range from about 3 to about 20 micrometers.

Suitable nonwoven mats are known in the art and are commercially available, for example, under the trademarked designation "SAFFIL LD MAT" from Imperial Chemicals, Inc., of Cheshire, U.K.

Preferred nonwoven mats can be prepared as described in U.S. Pat. No. 5,380,580 (Rogers et al.) the disclosure of which is incorporated herein by reference. The nonwoven mat can be needle punched, for example, as taught in the application just mentioned or stitch bonded as described for example, in U.S. Pat. No. 4,181,514 (Lefkowitz et al.), the disclosure of which is incorporated herein by reference.

Additional details regarding the constructions of diesel particulate filter cartridges and filters are disclosed in U.S. Pat. Nos. 5,248,481 (Bloom et al.) and 5,258,164 (Bloom et al.), the disclosures of which are incorporated herein by reference.

Further, to aid in the oxidation of carbon and soluble organic constituents (e.g., hydrocarbons and carbon monoxide) of diesel exhaust soot particulates, the filter element can further comprise an oxidation catalyst coated onto the inorganic fiber or yarn. Such oxidation catalysts are known in the art and include catalytic metal oxides (e.g., titanium oxide and vanadium pentoxide), precious metals (e.g., platinum, rhodium, other platinum group metals, and silver), and base metals (e.g., copper, iron, manganese, and potassium). Methods for coating the catalyst onto the inorganic yarn and nonwoven mat are known in the art.

Figure 14:
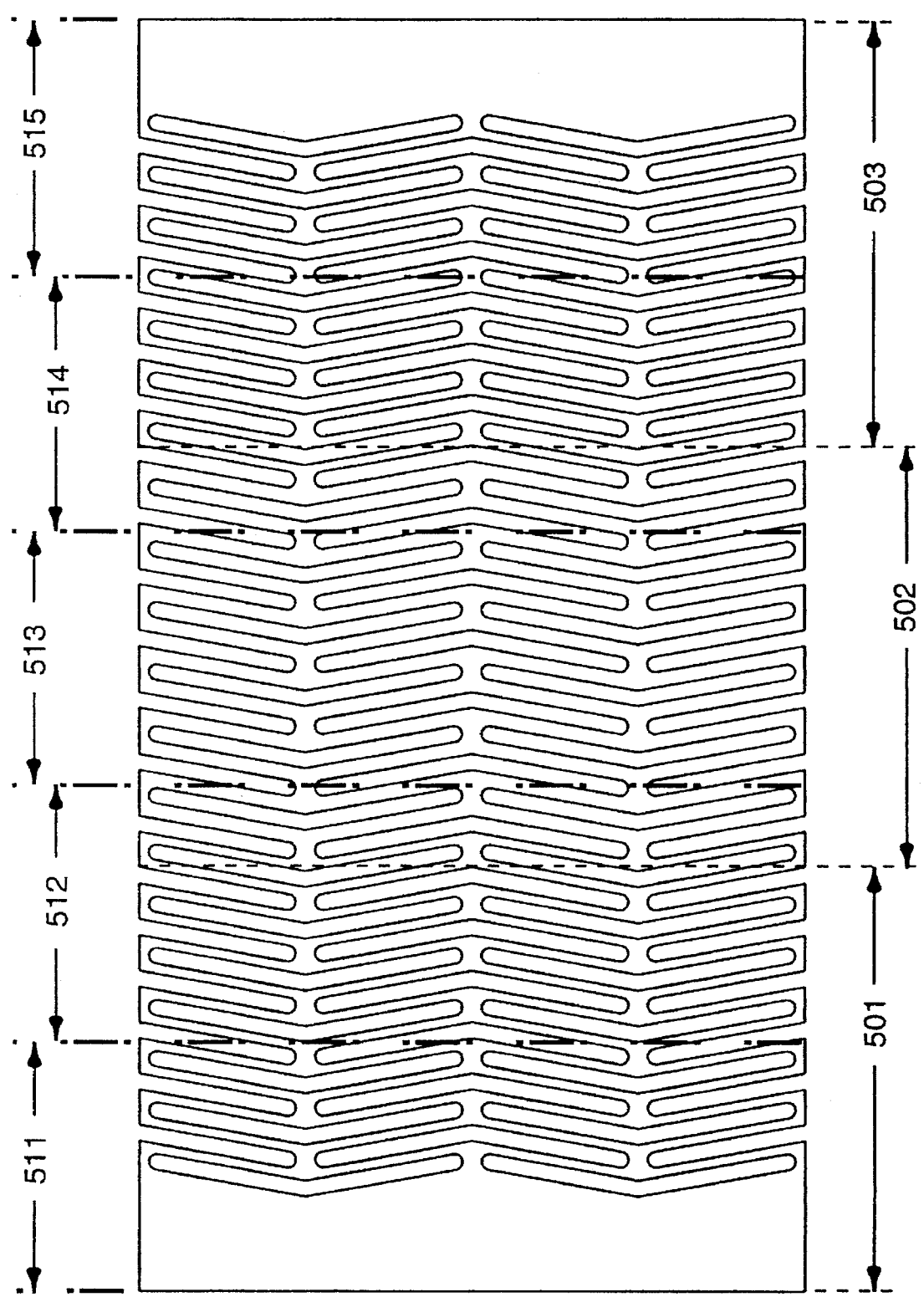
FIGS. 14, 15, 16, and 17 are flat views of preferred electrically resistive metal sheets useful in making electrically resistive heating elements employed in diesel particulate filter cartridges according to the present invention.

Preferred electrically resistive sheet configurations useful in making electrically resistive heating elements employed in diesel particulate filter cartridges and filters according to the present invention are shown in FIGS. 5, 14–18. The three resistive zones for the electrically resistive sheet shown in FIG. 14 are designation 501, 502, and 503. The five resistive zones for the electrically resistive sheet shown in FIG. 14 are designation 511, 512, 513, 514, and 515.

The electrical resistance of an electrically resistive sheet or tube (heating element) configuration is related to the element geometry and material from which it is made, and can be calculated by the following equation:

$$R = \rho L/A,$$

wherein

R is the electrical resistance, $\rho$ is the material resistivity,

L is the current path length, and

A is the current path cross-sectional area.

Figure 5:
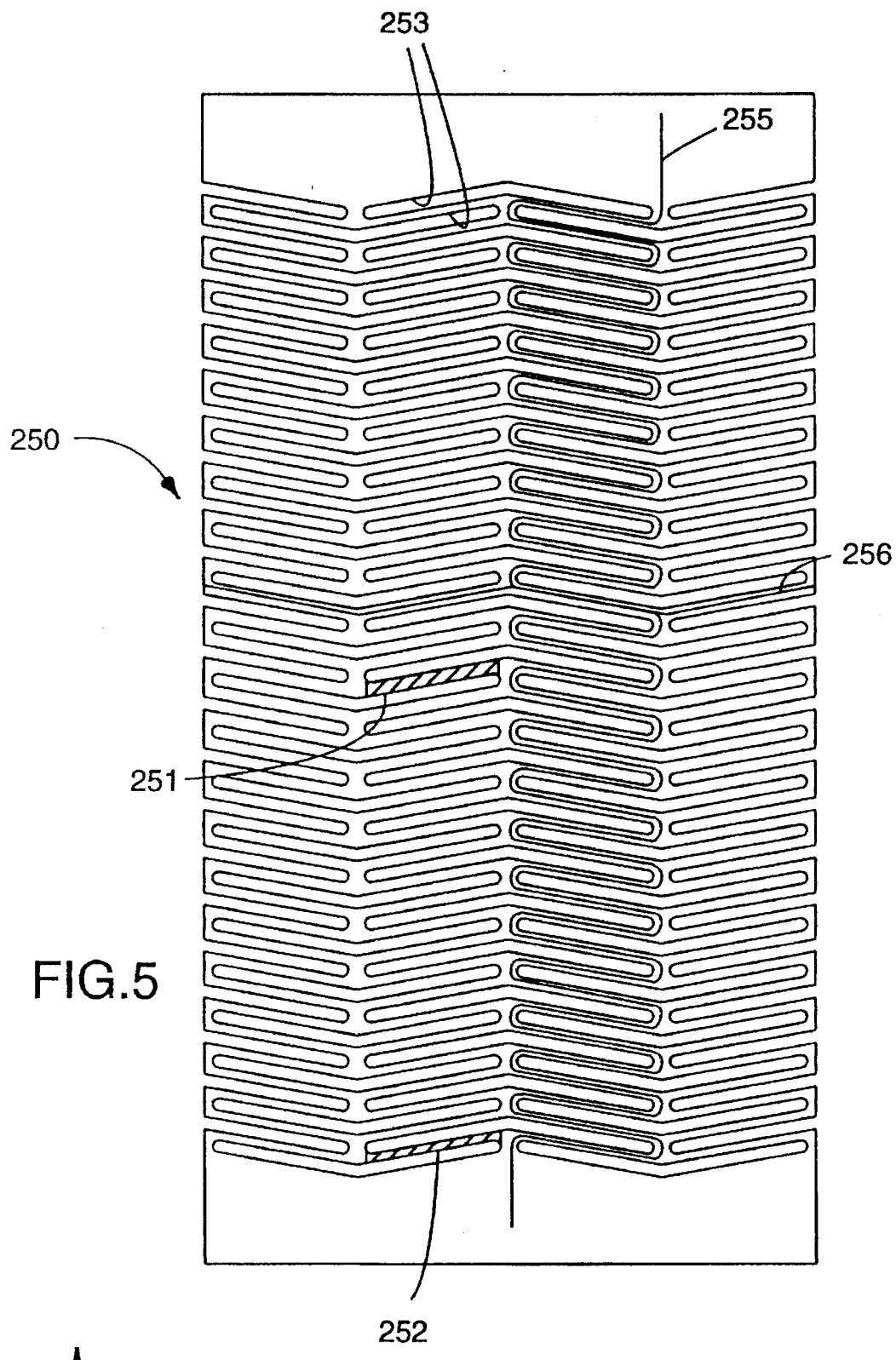
FIG. 5 a flat view of a slotted electrically resistive, linearly variable resistance sheet configuration (i.e., successive strands from either end of the sheet to the center of the sheet decrease in resistance) useful in making a diesel particulate filter cartridge according to the present invention, wherein strand width 251 located at the center of the sheet configuration is greater than the width of strand 252 located at an end of the sheet.

Referring to FIG. 5, the electrical resistance along the length of the heater is changed to achieve a desired heat distribution by changing strand width 251 and/or 252, and opening 253. For ease of manufacturing, it is preferable to change the strand width and keep the opening size constant.

The electrical resistance along the length and/or circumference of the heater can be changed, for example, by changing the strand width, the size or number of openings, the number of current paths, or a combination thereof. Further, electrical resistance of the sheet(s) or tube, can be changed by changing the material from which it is made, by varying the thickness of the strands, by varying the current path lengths, by varying the opening size, by varying the number of current paths, and by varying the number of strands. In addition, the material formulation of the tube can be varied from the ends to the center (i.e., resistance of the electrically resistive sheet(s) or tube can be adjusted by varying the formulation of the material from which it is made). Any of these parameters (i.e., strand width, size or number of openings, etc.) can be varied, for example, as a linear function of length and/or circumference, a step function of length and/or circumference, a parabolic function of length and/or circumference, exponential function of length and/or circumference, or any mathematical expression that relates the parameter to the heater length and/or circumference.

The openings, which can be, for example, circular, oval, rectangular, rectangular with radiused corners, diamond-shaped, triangular, or combinations of these shapes.

Preferably, the electrical resistance of the electrical resistivity tube or sheet is varied by changing the average cross-sectional area of individual strands.

If inorganic yarn is helically wound around the electrically resistive sheet(s) or tube lot support member), care should be taken in selecting the heating element configuration (including the number of strands, the width of the strands, the length of the strands, and the size of the openings) and the winding pattern of the yarn to prevent the yarn from falling through the openings of the electrically resistive sheet(s) or tube (or support member). For example, if openings in the electrically resistive sheet(s) or tube (or support member) are at an angle of 45° and the winding angle is at the same relative angle, the yarn, if it is thinner than the slot, would slip through the opening.

Preferably, the openings of the electrically resistive sheet (s) or tube occupy in the range from about 10 to about 70 percent of its projected area. More preferably, the openings of the electrically resistive sheet(s) or tube occupy in the range from about 40 to about 60 percent of its projected area. Projected opening areas with these ranges provide the best compromise between the desired low back pressure across the filter elements, the desired conformability to the associated filter elements, the desired rigidity or integrity of the electrically resistive sheet(s) or tube, and ease of manufacturing.

The size of the openings in the electrically resistive sheet(s) or tube are dependent on the particular filter cartridge requirements which include the power requirements, size of the filter cartridge, the location of the electrically resistive tube (e.g., exterior of filter element, buried within the filter element, or serves as the support tube to the filter element, and gas flow through the filter.

The strand width must be large enough for durability (not act as a fuse) yet small enough to provide the high electrical resistance required and limit the current through the heater. Typically the strand width is in the range of about 0.074 to 1.1 cm (about 0.030 to 0.45 inch) and more preferably in the range of about 0.1 to 0.65 cm (about 0.039 to 0.255 inch). Strand widths in these ranges typically result in an appropriate compromise between providing a durable heater, limiting the current through the heater, and allowing for the flexibility to alter the watt density of the variable resistant heater.

In some embodiments of the filter cartridges or filters according to the present invention, the current path length across the length of the electrically resistive tube is at least 1.1 times the length of the electrically resistive tube, and the current path length around the circumference of the electrically resistive tube is at least 1.01 times the circumference of the electrically resistive tube. In another aspect, the current path length across the length of the electrically resistive tube can be greater than the current path length around the circumference of the electrically resistive tube.

In some embodiments of the filter cartridges or filters according to the present invention, the current path length across the length of the electrically resistive sheet (i.e., the length from end to end) is at least 1.1 times the length of the electrically resistive sheet, and the current path length across the width of the electrically resistive sheet is at least 1.01 times the width of the electrically resistive sheet. In another aspect, the current path length across the length of the electrically resistive sheet can be greater than the current path length across the width of the electrically resistive sheet.

Preferably, the power concentration of the electrically resistive sheet configuration used is in the range from about 0.5 to about 7 watts/cm$^2$. Power consumption values within these ranges typically provide reasonable regeneration performance without excess energy consumption.

The material comprising the electrically resistive sheet(s) or tube should be resistant to high temperatures (e.g., temperatures above about 600° C., be chemically resistant to diesel exhaust, and be ductile). Preferably, the electrically resistive material is a metal. Suitable metals include expanded metal, stainless steel (commercially available, for example, from Falcon Stainless and Alloy Corp. of Waldwick, N.J.). Preferred metals include nickel-chrome-iron alloys (e.g., those commercially available under the trademarked designations "INCONEL 600" and "INCOLOY 800" from Inco Alloy International, Inc., of Huntington, W. Va, "HAYNES 556" from Haynes International of Kokomo, Ind., and "KANTHAL A1" from The Kanthal Corp. of Bethel, Conn.).

The openings can be cut into the electrically resistive sheets to provide the desired configurations using conventional processing techniques including punching, stamping, laser cutting, water jet cutting, and plasma cutting. Further, expanded metal sheets can be made from a metal sheet using conventional metal expanding techniques.

A sheet of electrically resistive material can be formed into a tube or partial tubular shaped by conventional techniques, which include bringing together and securing the side edges of the sheet to form the tube. Means for securing the edges of the sheet together include those known in the art such as welding, stapling, and riveting.

The openings are preferably uniformly distributed over the surface of the electrically resistive sheet(s) or tube, except the ends of the electrically resistive sheet(s) or tube which are preferably imperforate.

The electrically resistive sheet or tube has at least two current paths. Typically, the electrically resistive tube has at least four current paths, although six, eight, ten, twelve, or more are also useful. Typically, the electrically resistive sheet has at least four current paths, although five, six, six, seven, eight, nine, ten, eleven twelve, or more are also useful.

In some diesel particulate filter cartridges and filters according to the present invention, the electrically resistive sheet(s) or tube has a center point between the ends of the sheet(s) or tube, wherein at least one strand closer to the center point than to the end of the sheet(s) or tube has a current path less than the current path of at least one strand closer to the end of the sheet(s) or tube than to the center point.

In another aspect, in some diesel particulate filter cartridges and filters according to the present invention, the electrically resistive sheet(s) or tube has a center point between the ends of the sheet(s) or tube, wherein at least one strand closer to the center point than to the end of the sheet(s) or tube has an average width greater than the average width of at least one strand closer to the end of the sheet or tube than to the center point.

In another aspect, preferably the electrical resistance of each successive strand from an end to the center of a sheet or tube decreases.

For electrically resistive sheets or tubes having an oval or rectangular shaped opening, the cross-sectional area of each strand is preferably in the range from about 0.2 to about 16 mm$^2$, wherein the width of each strand is preferably in the range from about 1 to about 6.5 mm and the thickness of the electrically resistive material is preferably in the range from about 0.2 to about 2.5 mm.

Preferred electrically resistive tube configurations useful in making filter cartridges and filters according to the present invention have a circumferential stiffness of less than 40 percent of the circumferential stiffness of a comparable electrically resistive solid tube (i.e., the same tube without the openings). For additional details regarding circumferential stiffness, see U.S. Pat. No. 5,409,669 (Smith et al.), the disclosure of which is incorporated herein by reference.

Preferably, the circumferential stiffness of a slotted electrically resistive tube is less than about 25 percent (more preferably, less than 10 percent, even more preferably, less than 5, and most preferably, less than about 3 percent) of the circumferential stiffness of a comparable electrically resistive solid tube (i.e., the same tube without the slots). For further details regarding electrically resistive tubes having a circumferential stiffness than 40 percent of the circumferential stiffness of a comparable electrically resistive solid tube see U.S. Pat. No. 5,409,669 (Smith et al.), the disclosure of which is incorporated herein by reference.

For additional details on suitable electrically resistive sheets useful as heating elements in making filter cartridges and filters according to the present invention and on the construction of filter cartridges and filters, see copending applications having U.S. Ser. Nos. 08/223,545 and 08/223,595, filed the same date of the present application, now each abandoned.

Figure 1:
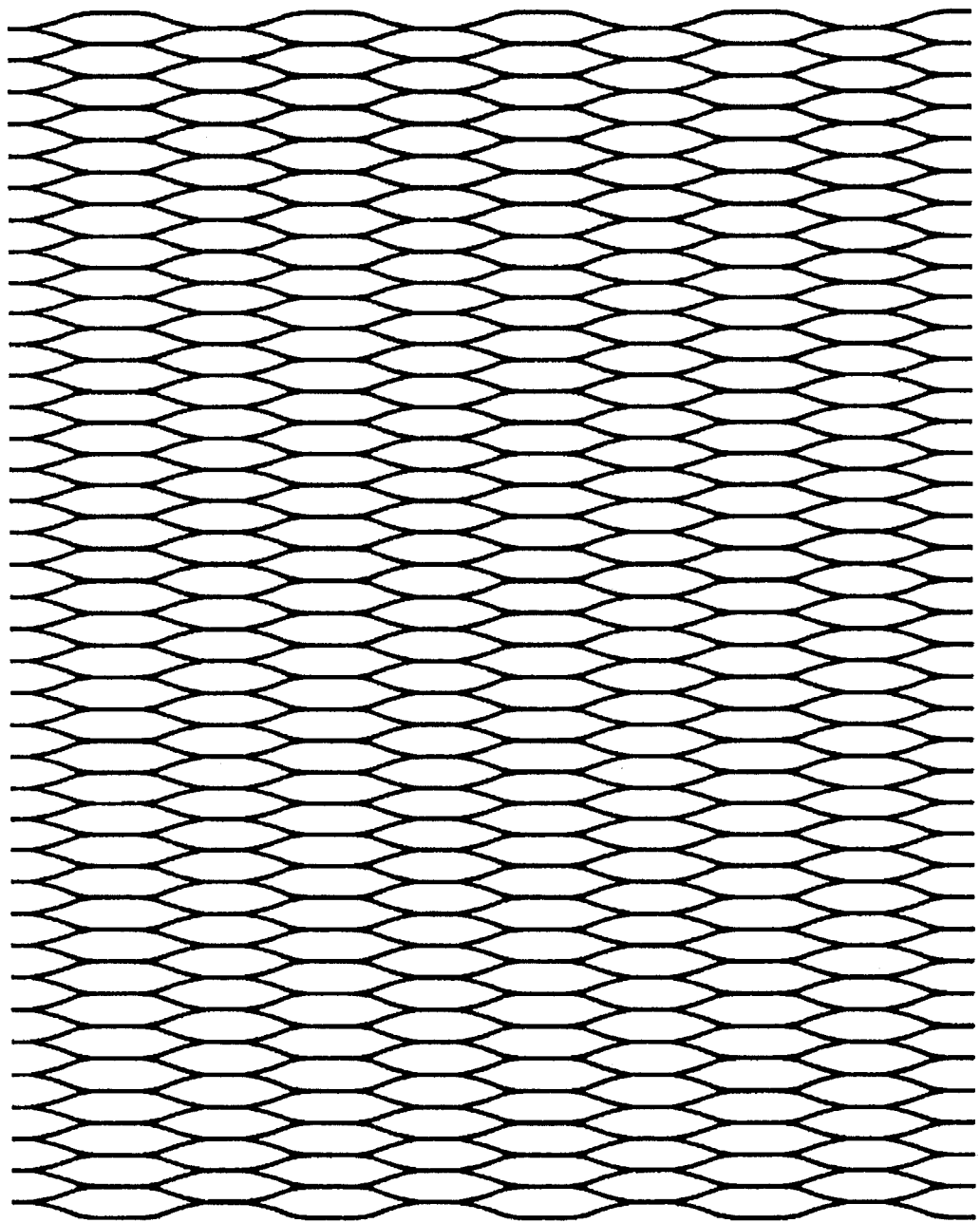
FIG. 1 is a flat view of an expanded metal sheet known to be useful in making an electrically resistive heating element used to regenerate a diesel particulate filter.
Figure 1:
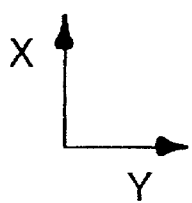
Figure 2:
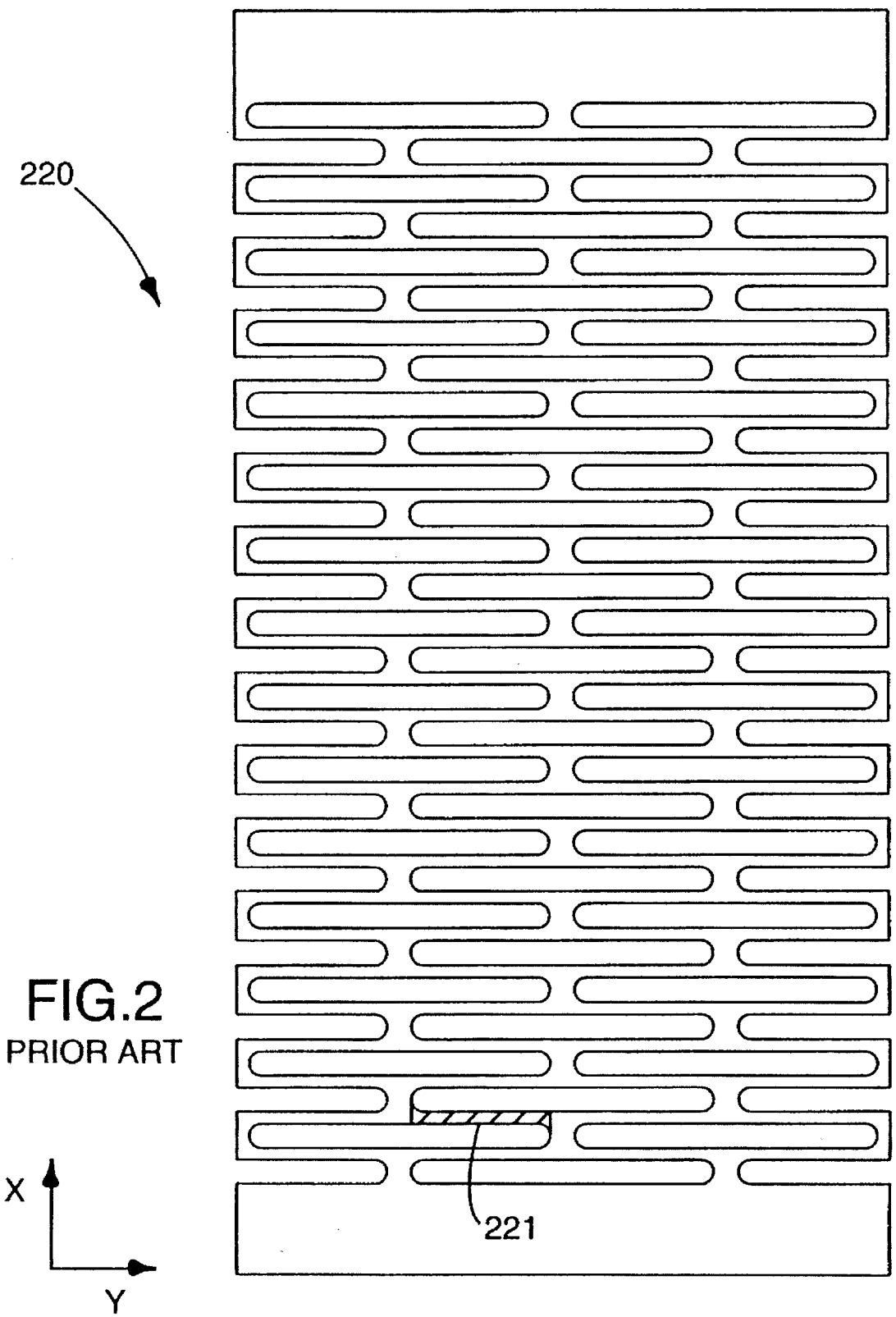
FIG. 2 is a flat view of a slotted electrically resistive sheet known to be useful in making an electrically resistive heating element used to regenerate a diesel particulate filter.
Figure 3:
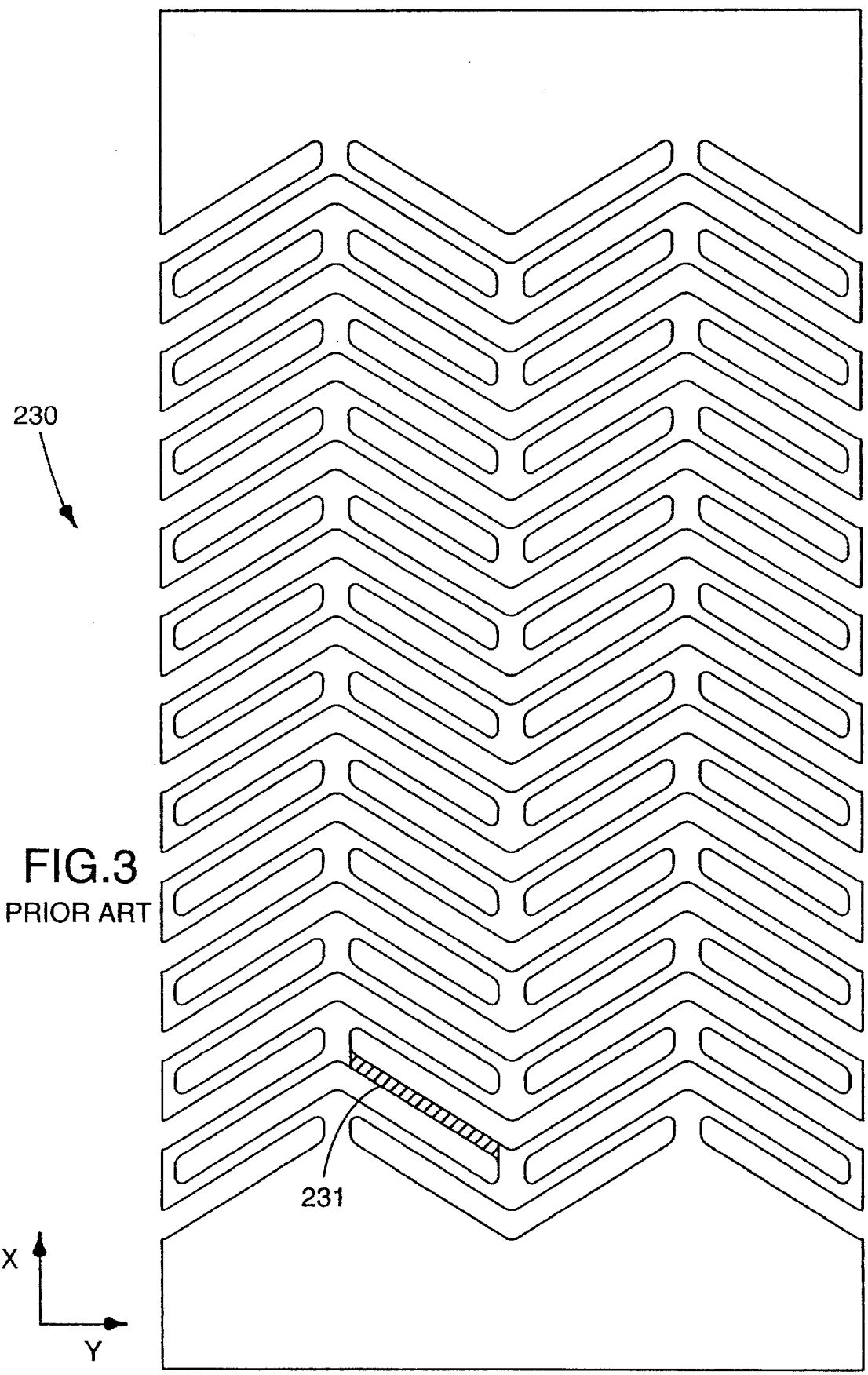
FIG. 3 is a flat view of another preferred electrically resistive sheet known to be useful in making an electrically resistive heating element used to regenerate a diesel particulate filter (see U.S. Pat. No. 5,409,669 (Smith et al.)
Figure 4:
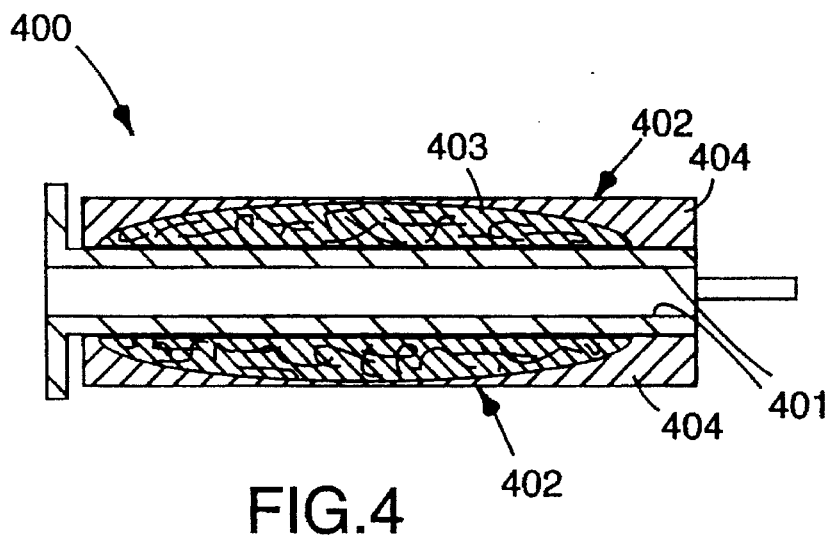
FIG. 4 is a longitudinal cross-section of a diesel particulate filter showing the "hot-zone" and typically non-combusted soot associated with known electrically regenerable diesel particulate filters as a result of non-uniform heater temperature.
Figure 19:
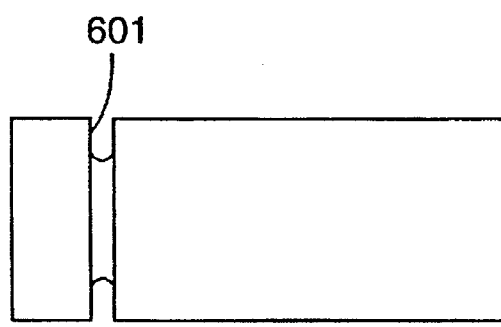
FIGS. 19 and 20 show examples of expansion joints which can be incorporated into the electrically resistive sheet(s) or tubes (or support member)
Figure 20:
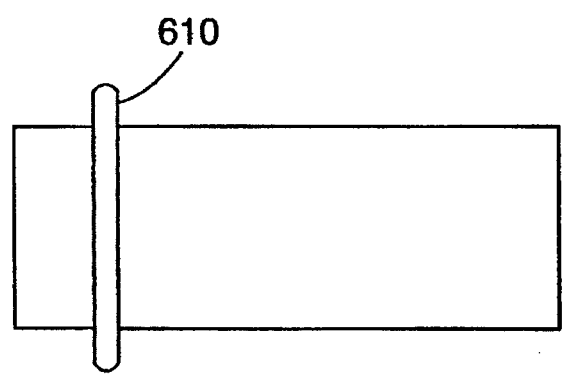
Figure 21:
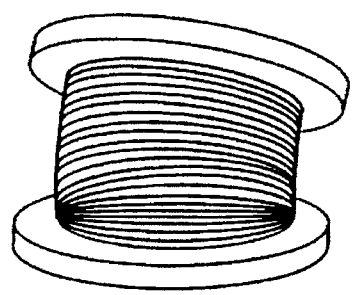
FIG. 21 shows an example of a bellow expansion joint which can be incorporated into the electrically resistive sheet(s) or tubes (or support member).

To reduce axial stress which occur during the heating of an electrically resistive sheet(s) or tube (or support member), axial expansion means can be incorporated into the electrically resistive sheet(s) or tube (or support member) using conventional techniques. The expansion means can be positioned along the electrically resistive sheet(s) or tube (or support member) depending on the parameters of the particular filter cartridge design. Typically, the expansion means are positioned at or near the ends of the electrically resistive sheet(s) or tube (or support member). Referring to FIGS. 19 and 20, expansion joints 601 and 610 are shown near an end of an electrically resistive sheet. Expansion joint 601 is a radially indented portion of the sheet, whereas expansion joint 610 is a radial expanded portion of the sheet. An example of a bellow expansion joint (commercially available, for example, from Standard-Thomson Corp. of Waltham, Mass.) is shown in FIG. 21.

Objects and advantages of this invention are further illustrated by the following examples, but the particular materials and amounts thereof recited in these examples, as well as other conditions and details, should not be construed to unduly limit this invention.

Example 1 and Comparative A

Four filter cartridges substantially as shown in FIG. 7 were constructed and mounted in a casing to provide a diesel filter or trap substantially as shown in FIGS. 8 and 9. The casing was made of conventional 304 stainless steel.

The electrically resistive tube was about 254 mm long, had an outside diameter of 42 mm, and was formed from a 0.46 mm thick nickel-chrome-iron alloy sheet (commercially available under the trade designation "INCONEL 600" from Inco Alloy International of Kokomo, Ind.). Rectangular radius cornered holes were laser cut into the sheet to provide the geometry shown in FIG. 14. The strand width (at the center of the strand) of the strands closest to either end of the tube was 1.95 mm (0.0766 inch). The strand width (at the center of the strand) of the strands at the center of the tube was 3 mm (0.119 inch). The total resistance of the electrically resistive tube formed from the sheet was 0.352 ohm. The end of the tube with the larger imperforate area was at the end with cap 21 (see FIG. 7).

Using a conventional brake press, a round bar stock was attached to the press to apply the shape needed to bump the electrically resistive sheet into a tube. The sides of the sheet brought together to form the tube were welded together.

The electrically resistive tube was helically cross-wound with 17 layers of 2/2, 1.5z, 1800 denier alumina-boria-silica ceramic yarn (commercially available under the trade-marked designation "NEXTEL 312 CERAMIC YARN" from the 3M Company) which had been lightly texturized using an air jet texturizing machine (commercially available under the trade designation "MODEL 17 SIDEWINDER" with a "MODEL 52D JET" from Enterprise Machine and Development Corp. of New Castle, Del.). The speed of the texturizing machine was set at about 26.5 meters per minute. The jet was opened about ¾ of a turn from its most closed position. The air pressure was set at about 550 kPa.

Specifically, the ceramic yarn was helically wound around the tubes using a three-axis computer-controlled precision winding machine (Automation Dynamics of Signal Hills, Calif.). The winding angle for the first layer was 47°. During winding the yarn was kept at a constant tension of about 14.2 Newtons. For each successive layer, the winding angle was increased slightly so that the core of the yarn for each successive layer was aligned with the core of the yarn of the underlying core of yarn such that four-sided openings were provided.

At each imperforate area of the tubes (i.e., at each end of the tube) the winding pattern was modified to have a 60° dwell providing dense end walls, which serves to block unfiltered exhaust gas escaping at the ends of the filters.

For the first layer of cross-wound yarn, the opening size between opposite corners of the "four-sided openings" was about 9.3 mm in each of the axial and circumferential directions of the tubes. The opening size between the opposite corners of "four-sided openings" comprising the last (i.e., seventeenth) layer was about 9.3 mm in the axis direction and about 14.4 mm in the circumferential direction of the tubes.

The outside diameter of the tubes having the helically cross-wound yarn thereon was about 65 mm. The seventeen layers of ceramic yarn weighed about 210 grams.

The conical inlet of the casing was connected to the exhaust system of a 3.4 liter, six cylinder, 4 stroke, diesel engine (commercially available under the trade designation "CUMMINGS 6A3.4 DIESEL ENGINE" from Cummings Engine Company of Columbus, Ind.). A conventional hydraulic load bank was attached to the torque shaft of the engine and maintained at a pressure of 9653 kPa (1400 psi) throughout the test to provide a controlled load on the engine. The engine was run at about 1500 rpm with an exhaust temperature at about 280° C. resulting in an exhaust flow rate of about 245 m³/hr (i.e., cubic meters per hour) (145 acfm) (i.e., cubic feet per minute).

The back pressure at the beginning of each test was about 2.5 cm of water (0.25 kPa). The engine was operated until the backpressure drop across each diesel filter cartridge reached 152 cm of water (60" water). At that time an exhaust valve was closed to divert the engine exhaust around the diesel trap to begin the electrical regeneration cycle.

For the regeneration cycle, about 0.1 m³/min. (2 scfm) (i.e., (standard cubic feet per minute)) of air was routed into the diesel trap to provide a sufficient amount of oxygen and transfer of heat into the filter to complete the soot burning process. During this time 12 volts (each heater consuming about 410 watts of power) were applied across each heater for 10 minutes. Upon completion of the regeneration the engine exhaust was again routed back through the diesel trap. The 12 volts was provided by a conventional external, 12 volt dc power supply attached through an electrical leads to the threaded metal post each filter cartridge and an electrical lead to the base of the casing (common ground).

The filter cartridges was again loaded with soot by operating the engine until the backpressure drop across each diesel filter cartridge reached 152 cm of water (60" water). After the backpressure drop had reached the 152 cm level, the engine was stopped and the diesel trap allowed to cool to room temperature. The four diesel filter cartridges were removed from the casing and individually weighed.

The filter cartridges were then again assembled into the casing and the diesel filter reconnected to the engine system. The regeneration cycle described above was repeated. After regeneration, each diesel filter cartridge was removed from the casing and individually weighed.

The filter cartridges were then placed in a conventional paragon high temperature oven at 550° C. for 2 hours to burn out any remaining diesel soot. Each filter cartridge was then cooled to room temperature and individually weighed.

The data for the second loading of the filter cartridges and the subsequent regeneration is provided in Table 1, below. The amount of soot combusted equal to the difference in weight of the filter cartridge before and after regeneration. The amount of soot in the filter cartridge was equal to difference between the weight of the filter cartridge before regeneration and after cleaning in the paragon high temperature oven. The weight percent of soot burned for each filter cartridge was equal to the amount of soot combusted divided by the amount of soot in the filter cartridge times 100%.

TABLE 1

| Example 1 filter cartridge no. | Amount of soot combusted, g | Amount of soot in filter cartridge, g | Weight percent of soot burned out, % |
| --- | --- | --- | --- |
| 1 | 2.5 | 3.2 | 78 |
| 2 | 2.5 | 3.4 | 74 |
| 3 | 2.6 | 3.5 | 74 |
| 4 | 2.1 | 2.7 | 78 |

Figure 6:
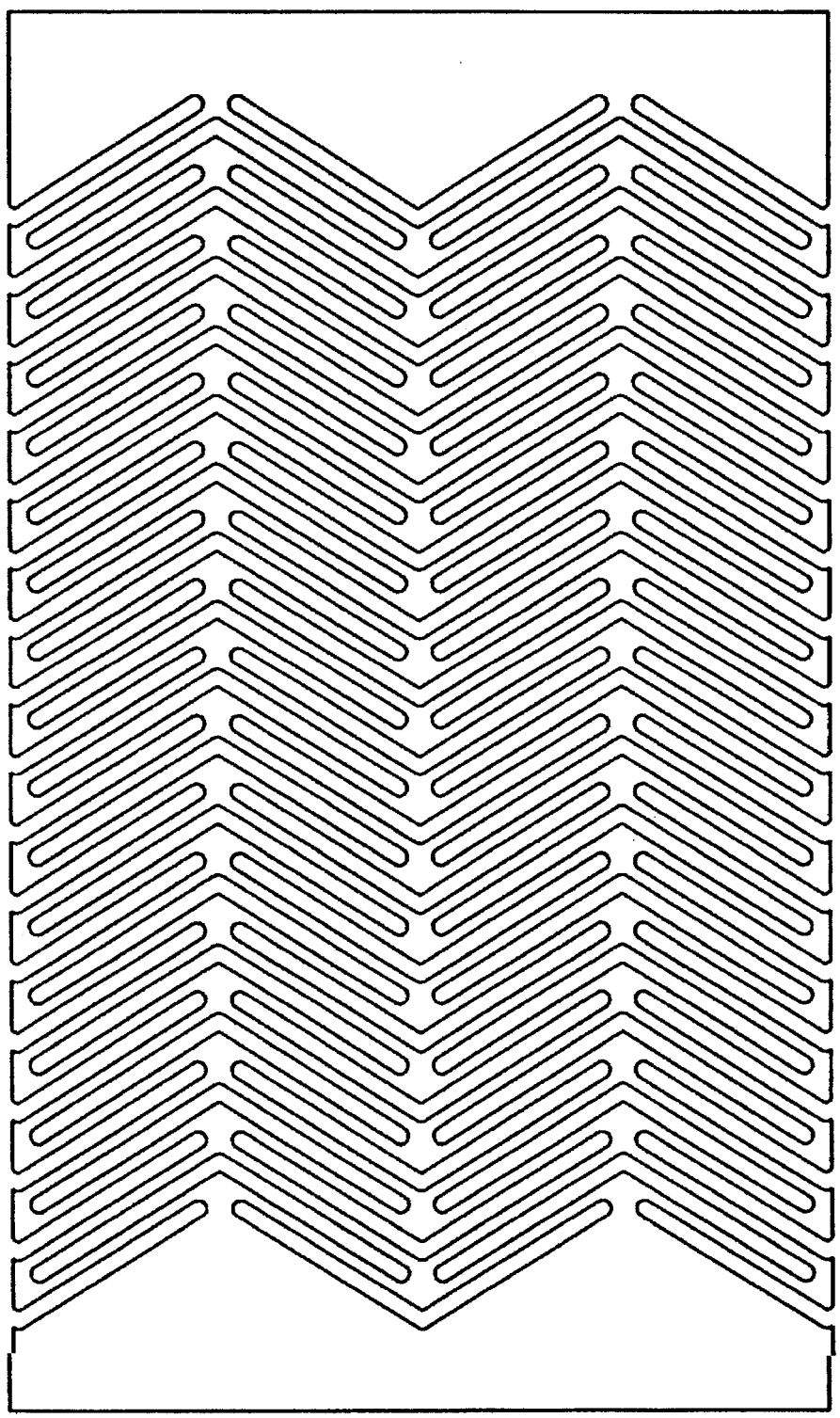
FIG. 6 is a flat view of a slotted electrically resistive sheet known to be useful in making an electrically resistive heating element used to regenerate a diesel particulate filter.

Comparative A was constructed and tested as described for Example 1 except the geometry of the electrically resistive sheet used to form the tube was as shown in FIG. 6. The data from the testing of Comparative A is provided in Table 2, below.

TABLE 2

| Comparative A filter cartridge no. | Amount of soot combusted, g | Amount of soot in filter cartridge, g | Weight percent of soot burned out, % |
| --- | --- | --- | --- |
| 1 | 2.0 | 3.0 | 67 |
| 2 | 1.9 | 3.0 | 63 |
| 3 | 2.2 | 3.0 | 73 |
| 4 | 1.9 | 3.0 | 63 |

The results of the Example 1 and Comparative A test result are summarized in Table 3, below.

TABLE 3

| Example | Average weight percent of soot burned out, % |
| --- | --- |
| 1 | 76 |
| Comparative A | 67 |

The test results of the Example 1 filter (and filter cartridges) show the improved regeneration provided the an electrically resistive tube according to the present invention as compared to the electrically resistive tube used for Comparative A.

Example 2

Figure 15:
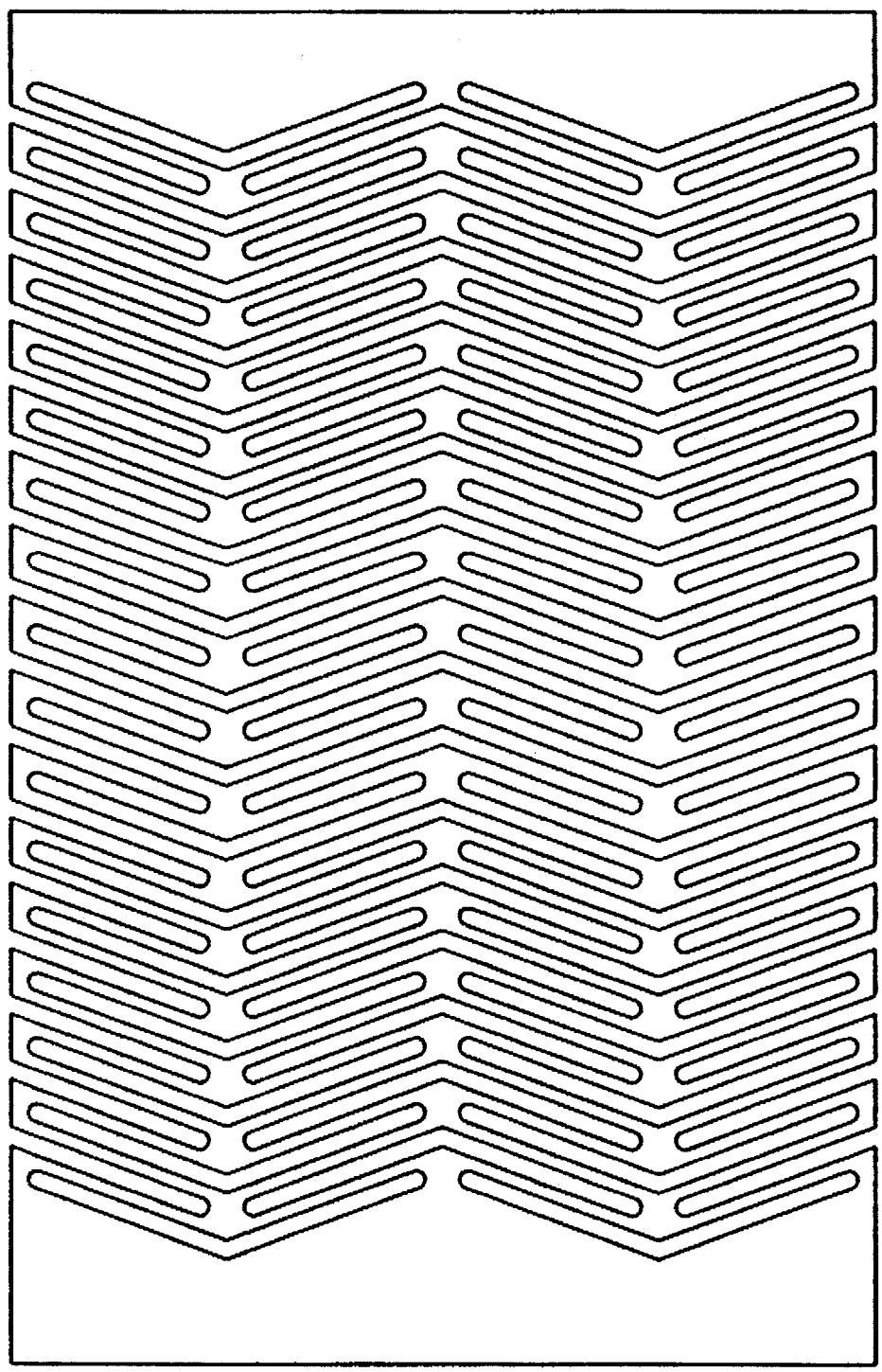
Figure 16:
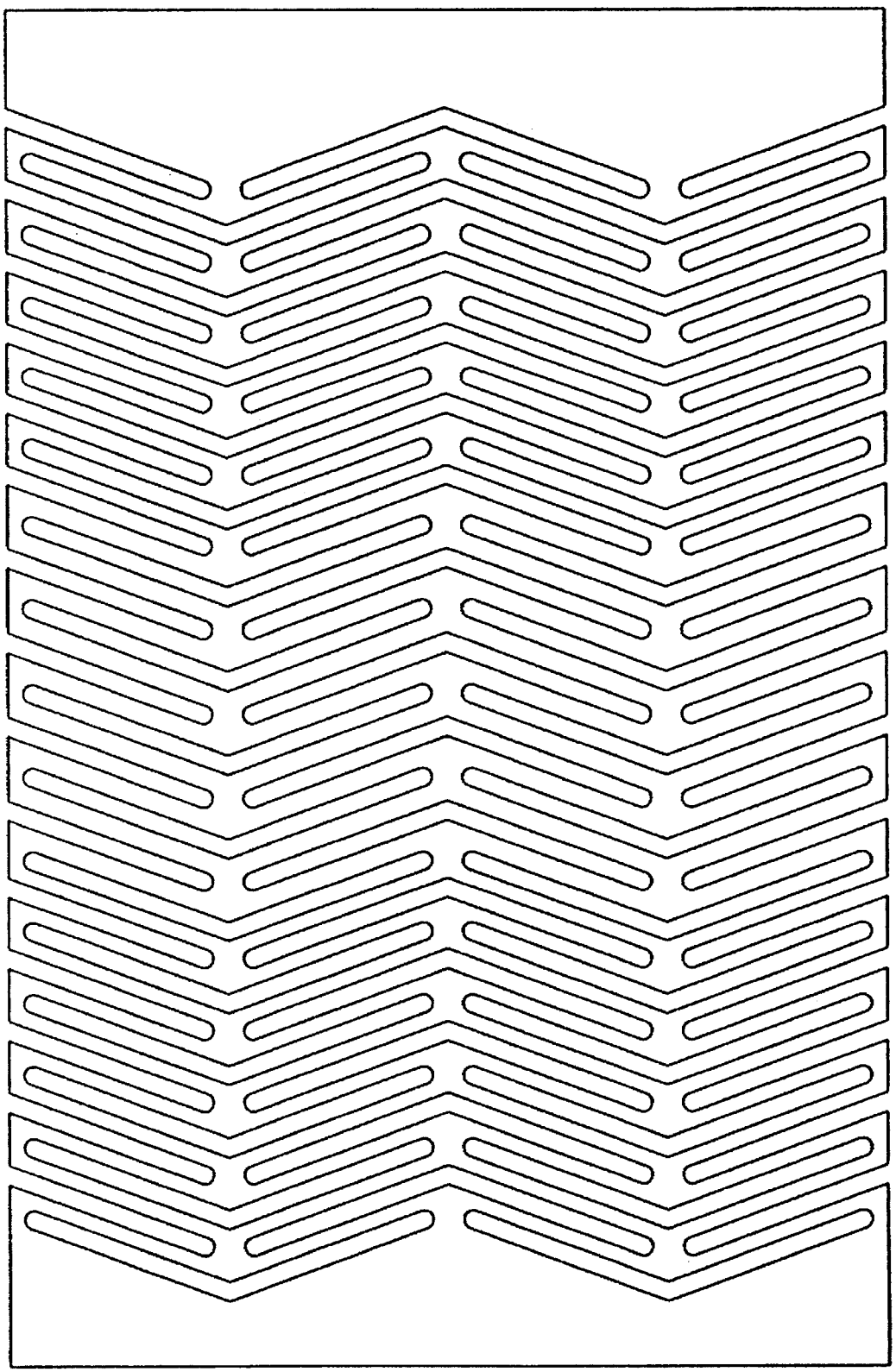
Figure 17:
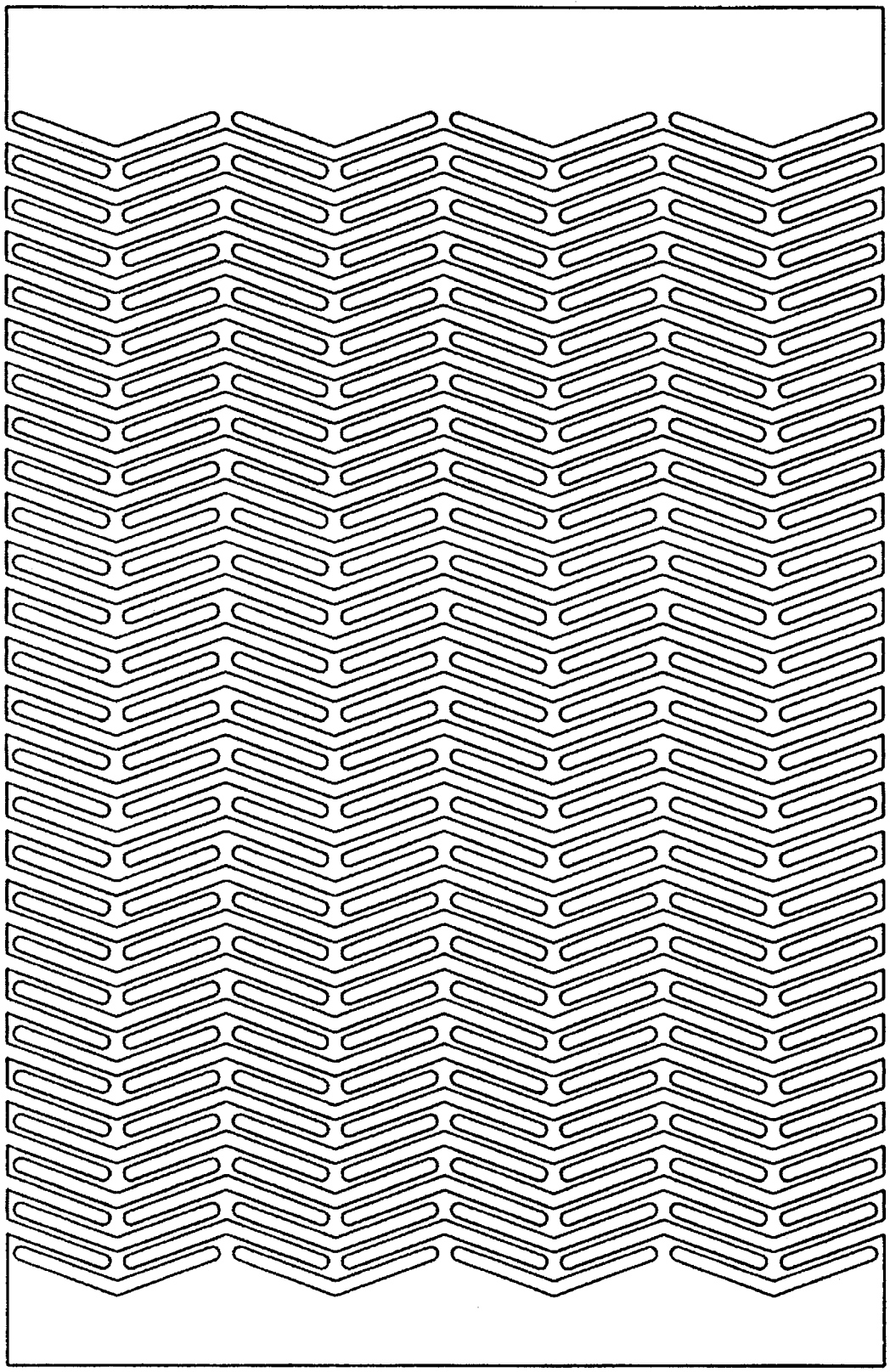
Figure 18:
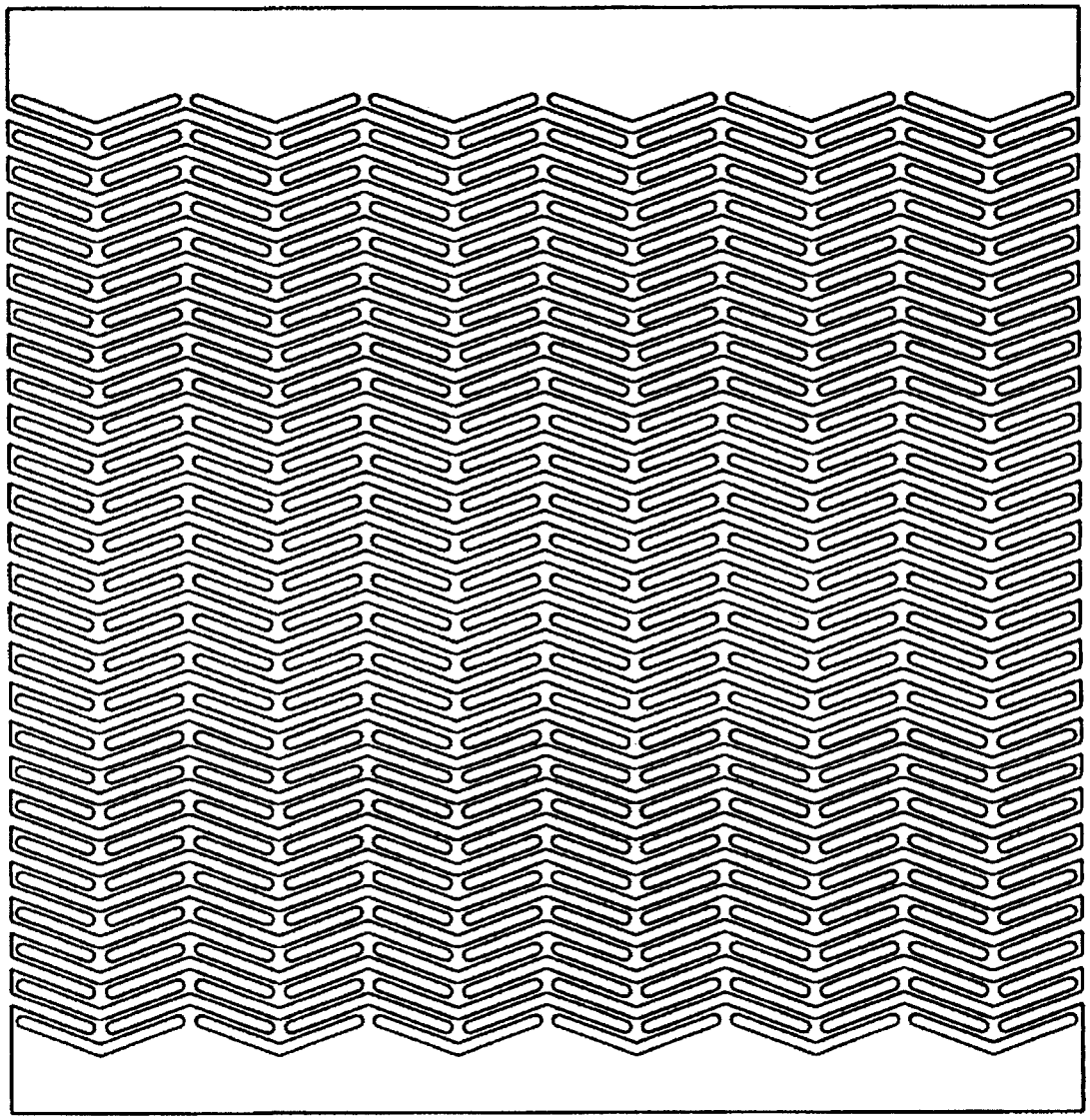
FIG. 18 a flat view of a slotted electrically resistive, variable resistance sheet configuration useful in making a diesel particulate filter cartridge according to the present invention, wherein there are twelve current paths between the ends of the sheet.

The Example 2 filter was constructed described in Example 1 with the following exceptions. The outside diameter of the electrically resistive tube was 50.8 mm (2 inches). The electrical resistance of the electrically resistive tube 0.288 ohm. The voltage applied across the length of each tube was 13.2 volts, resulting in 600 watts of power per filter cartridge. The configuration of the electrically resistive sheet used to form the tube is shown in FIG. 15. The strand width (at the center of the strand) of the strands closest to either end of the tube was 2.4 mm (0.096 inch). The strand width (at the center of the strand) of the strands at the center of the tube was 3.2 mm (0.125 inch). The end of the tube with the larger imperforate area was at the end with cap 21 (see FIG. 7). (Other preferred configurations, preferably used with a 12 volt power source, are shown in FIGS. 16–18. Further, the configuation shown in FIG. 18 is preferably used to make a 76.2 mm (3 inch) diameter elcetrically resistive tube). All metal parts were stainless steel unless otherwise designated.

Further, the filter media was provided as follows. First, ten layers of radially-aligned lightly texturized yarn ("NEXTEL 312") were applied at an initial winding angle of 47° to provide an initial Filter Band Width of 8.38 mm. Each layer was made up of ten circuits. After advancing the mandrel of the filament winder 23.5°, two layers of lightly texturized yarn were applied to form radial walls bisecting the four-sided openings of the first ten layers. After advancing the mandrel another 23.5°, two layers of the lightly texturized yarn were applied to form radial walls bisecting the four-sided openings of the preceding two layers. The diameter of the filter media on the tube was 59.4 mm.

The conical inlet of the casing was connected to the exhaust system of a 2.3 liter, four cylinder, 4 stroke, diesel engine electrical generator set (commercially available under the trade designation "ONAN L423 DIESEL ENGINE" from Onan Corporation of Anoka, Minn.). Four electrical heaters were placed on the generator set to serve as a power load for the system.

Under the steady state engine conditions of the generator set, the initial filter backpressure was about 6.35 cm of water at 3.0. m³/min. The time it took for the trap exhaust backpressure to increase from about 6.35 cm to about 114 cm of water was recorded between successive cycles. When the system backpressure reached 114 cm of water, the exhaust valve was closed to bypass the exhaust around the diesel filter during each cycle.

The cartridge was then energized (regenerated) by applying about 13.2 volts at 45 amps across each filter cartridge for about 10 minutes. During this time heater temperatures of 750°–800° C. were achieved causing the soot to oxidize. Regeneration air flow of 14.16 lpm per filter cartridge were supplied from compressed air to assist soot combustion during energization. An additional 1 minute of air flow without energizing the filter cartridges to allow the filter cartridges to gradually cool down. The exhaust valve was then opened to allow the exhaust to resume flowing through the filters.

The loading and regeneration cycle was repeated for 1120 hours of engine use. Low sulfur fuel (0.05% sulfur; "AMO-FUEL L.S. '94 DIESEL FUEL" from Amoco Oil Co. of Chicago, Ill.) and low ash oil (0.6% ash by weight; available under the trade designation "SUNOCO ULTRA SUPER C GOLD 15W40" from Sun Refining & Marketing Co. of Philadelphia, Pa.) were used for the entire 1120 hours of operation.

Upon completion of the last regeneration, the filter cartridges were weighed and then placed in the paragon high temperature oven at 550° C. for 2 hours to burn out any remaining diesel soot. The filters were then reweighed to determine the amount of residual soot. An average value of 0.525 gram of residual soot remained in each filter that typically holds from about 2.2–2.55 grams of soot after the loading cycle.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A diesel particulate filter cartridge comprising:

(a) a substantially rigid, electrically resistive tube having an outer surface, a first end, a second end, openings extending from said outer surface to an inner surface, a length extending between said ends of said electrically resistive tube, and current paths extending across said length; wherein said electrically resistive tube has a first, a second, and a third resistive zone between said ends of said electrically resistive tube; wherein each zone has a length equal to one third of said length of said electrically resistive tube; wherein said second zone is positioned between said first and third zones; wherein when a voltage is applied across said first and second ends of said electrically resistive tube, a quantity of heat is generated in each zone; wherein strands each having a width are present between openings, and wherein at least one of (i) the average width of the strands in each of said first and third resistive zones is less than the average width of the strands in said second electrically resistive zone such that said quantity of heat generated in each of said first and third zones is greater than said quantity of heat generated in said second zone, (ii) the number of current paths along the length of each of said first and third zones is greater than the number of current paths along the length of said second zone such that said quantity of heat generated in each of said first and third zones is greater than said quantity of heat generated in said second zone, or (iii) the average current path length along the length of each of said first and third zones is greater than the average current path length along the length of said second zone such that said quantity of heat generated in each of said first and third zones is greater than said quantity of heat generated in said second zone;

(b) a filtering element comprising inorganic fiber covering said openings of said electrically resistive tube; and (c) means for applying a voltage across said ends of said electrically resistive tube to heat it above the combustion point of entrapped diesel exhaust particulate, said electrically resistive tube being positioned such that when a voltage is applied across said electrically resistive tube, sufficient heat is transferred from said electrically resistive tube to soot particles entrapped in said filtering element such that said soot particles burn off.

2. The diesel particulate filter cartridge according to claim 1 wherein at least one of (i) the average width of the strands in each of said first and third electrically resistive zones is less than the average width of the strands in the second electrically resistive zone such that said quantity of heat generated in each of said first and third zones is at least 5 percent greater than said quantity of heat generated in said second zone, (ii) the number of current paths along the length of each of said first and third zones is greater than the number of current paths along the length of said second zone such that said quantity of heat generated in each of said first and third zones is at least 5 percent greater than said quantity of heat generated in said second zone, or (iii) the average current path length along the length of each of said first and third zones is greater than the average current path length along the length of said second zone such that said quantity of heat generated in each of said first and third zones is at least 5 percent greater than said quantity of heat generated in said second zone.

3. The diesel particulate filter cartridge according to claim 2 wherein said electrically resistive tube is made of metal and said inorganic fiber is ceramic oxide fiber.

4. The diesel particulate filter cartridge according to claim 3 wherein said filter element comprises material selected from the group consisting of helically wound ceramic yarn, a woven fabric comprising ceramic yarn, a nonwoven mat comprising ceramic yarn, and combinations thereof.

5. The diesel particulate filter cartridge according to claim 3 wherein said ceramic oxide fiber is substantially helically cross-wound as ceramic oxide yarn around said electrically resistive tube to cover said openings of said electrically resistive tube, wherein said ceramic oxide yarn comprises a core from which a plurality of loops of continuous fibers, fiber segments or a combination thereof extend outwardly, wherein cores of successive convolutions of each successive layer are radially aligned to provide walls that are spaced to define four-sided openings, said walls providing stabilization to said filtering element against exhaust forces, and wherein said plurality of loops of fibers, fiber segments or a combination thereof project into each of said four-sided openings, with said plurality of loops of fibers, fiber segments or a combination thereof of adjacent convolutions being intermeshed to provide with each of said four-sided openings a trap for diesel exhaust particulates, and wherein said electrically resistive tube has an imperforate area at each end thereof, and cores of adjacent convolutions of said yarn at said imperforate areas are spaced closely to provide relatively thick end walls that are substantially impervious to the flow of exhaust.

6. The diesel particulate filter cartridge according to claim 3 wherein said filter element comprises fabric comprising an unknotted weave of (a) flexible, substantially incompressible, substantially uncrimped, spaced support strands and (b) flexible, lofty, substantially fully crimped fill yarns which are pulled tightly against said support strands.

7. The diesel particulate filter cartridge according to claim 3 further comprising means for forcing exhaust gases to flow through said openings of said electrically resistive tube.

8. A diesel particulate filter comprising:
  (a) a casing having at least two ends;
  (b) means for connecting said at least two ends of said casing to an exhaust system;
  (c) means for supporting at least one diesel particulate filter cartridge; and
  (d) at least one diesel particulate filter cartridge according to claim 1, wherein said two ends of said electrically resistive tube extend between said at least two ends of said casing and being supported in said casing by said supporting means.

9. The diesel particulate filter cartridge according to claim 1 wherein said electrically resistive tube is made of metal and said inorganic fiber is ceramic oxide fiber, and wherein at least one of (i) the average width of the strands in each of said first and third electrically resistive zones is less than the average width of the strands in the second electrically resistive zone such that said quantity of heat generated in each of said first and third zones is at least 10 percent greater than said quantity of heat generated in said second zone, (ii) the number of current paths along the length of each of said first and third zones is greater than the number of current paths along the length of said second zone such that said quantity of heat generated in each of said first and third zones is at least 10 percent greater than said quantity of heat generated in said second zone, or (iii) the average current path length along the length of each of said first and third zones is greater than the average current path length along the length of said second zone such that said quantity of heat generated in each of said first and third zones is at least 10 percent greater than said quantity of heat generated in said second zone.

10. The diesel particulate filter cartridge according to claim 1 wherein said electrically resistive tube is made of metal and said inorganic fiber is ceramic oxide fiber, and wherein at least one of (i) the average width of the strands in each of said first and third electrically resistive zones is less than the average width of the strands in the second electrically resistive zone such that said quantity of heat generated in each of said first and third zones is at least 30 percent greater than said quantity of heat generated in said second zone, (ii) the number of current paths along the length of each of said first and third zones is greater than the number of current paths along the length of said second zone such that said quantity of heat generated in each of said first and third zones is at least 30 percent greater than said quantity of heat generated in said second zone, or (iii) the average current path length along the length of each of said first and third zones is greater than the average current path length along the length of said second zone such that said quantity of heat generated in each of said first and third zones is at least 30 percent greater than said quantity of heat generated in said second zone.

11. The diesel particulate filter cartridge according to claim 1 wherein said electrically resistive tube is made of metal and said inorganic fiber is ceramic oxide fiber, and wherein at least one of (i) the average width of the strands in each of said first and third electrically resistive zones is less than the average width of the strands in the second electrically resistive zone such that said quantity of heat generated in each of said first and third zones is at least 45 percent greater than said quantity of heat generated in said second zone, or (ii) the number of current paths along the length of each of said first and third zones is greater than the number of current paths along the length of said second zone such that said quantity of heat generated in each of said first and third zones is at least 45 percent greater than said quantity of heat generated in said second zone, or (iii) the average current path length along the length of each of said first and third zones is greater than the average current path length along the length of said second zone such that said quantity of heat generated in each of said first and third zones is at least 45 percent greater than said quantity of heat generated in said second zone.

12. The diesel particulate filter cartridge according to claim 1 wherein said electrically resistive tube has at least twelve current paths.

13. A diesel particulate filter cartridge comprising:
  (a) a substantially rigid, electrically resistive tube having an outer surface, a first end, a second end, openings extending from said outer surface to an inner surface, a length extending between said ends of said electrically resistive tube, and current paths extending across said length; wherein said electrically resistive tube has a first, a second, a third, a fourth, and a fifth resistive zone between said ends of said electrically resistive tube; wherein each zone has a length equal to one fifth of said length of said electrically resistive tube; wherein said second zone is positioned between said first and third zones, said third zone positioned between said second and fourth zones, and said fourth zone positioned between said third and fifth zones; wherein when a voltage is applied across said first and second ends of said electrically resistive tube, a quantity of heat is generated in each zone; wherein strands each having a width are present between openings, and wherein at least one of (i) the average width of the strands in each of said second and fourth resistive zones is less than the average width of the strands in said third electrically resistive zone such that said quantity of heat generated in each of said second and fourth zones is greater than said quantity of heat generated in said third zone, (ii) the number of current paths along the length of each of said second and fourth zones is greater than the number of current paths along the length of said third zone such that said quantity of heat generated in each of said second and fourth zones is greater than said quantity of heat generated in said third zone, or (iii) the average current path length along the length of each of said second and fourth zones is greater than the average current path length along the length of said third zone such that said quantity of heat generated in each of said second and fourth zones is greater than said quantity of heat generated in said third zone;
  (b) a filtering element comprising inorganic fiber covering said openings of said electrically resistive tube; and
  (c) means for applying a voltage across said ends of said electrically resistive tube to heat it above the combustion point of entrapped diesel exhaust particulate, said electrically resistive tube being positioned such that when a voltage is applied across said electrically resistive tube, sufficient heat is transferred from said electrically resistive tube to soot particles entrapped in said filtering element such that said soot particles burn off.

14. The diesel particulate filter cartridge according to claim 13 wherein said electrically resistive tube is made of metal and said inorganic fiber is ceramic oxide fiber.

15. The diesel particulate filter cartridge according to claim 14 further comprising means for forcing exhaust gases to flow through said openings of said electrically resistive tube.

16. The diesel particulate filter cartridge according to claim 14 wherein at least one of (i) the average width of the strands in each of said first and fifth electrically resistive zones is less than the average width of the strands in the second, third, and fourth electrically resistive zones such that said quantity of heat generated in each of said first and fifth zones is greater than said quantity of heat generated in each of said second, third, and fourth zones, (ii) the number of current paths along the length of each of said first and fifth zones is greater than the number of current paths along the length of each of said second, third, and fourth zones such that said quantity of heat generated in each of said second, third, and fourth zones is greater than said quantity of heat generated in each of said second, third, and fourth zones, or (iii) the average current path length along the length of each of said first and fifth zones is greater than the average current path length along the length of each of said second, third, and fourth zones such that said quantity, of heat generated in each of said first and fifth zones is greater than said quantity of heat generated in each of said second, third, and fourth zones.

17. A diesel particulate filter comprising:
(a) a casing having at least two ends;
(b) means for connecting said at least two ends of said casing to an exhaust system;
(c) means for supporting at least one diesel particulate filter cartridge; and
(d) at least one diesel particulate filter cartridge according to claim 15, wherein said two ends of said electrically resistive tube extend between said at least two ends of said casing and being supported in said casing by said supporting means.

18. The diesel particulate filter cartridge according to claim 14 wherein said electrically resistive tube has at least twelve current paths.

19. A diesel particulate filter cartridge comprising:
(a) a substantially rigid, hollow tubular support member having two ends and an outer surface with openings extending from said outer surface to an inner surface;
(b) a first filtering element comprising inorganic fiber covering said openings;
(c) an electrically resistive sheet having an outer surface, a first end, a second end, openings extending from said outer surface to an inner surface, a length extending between said ends of said electrically resistive sheet, and current paths extending across said length; wherein said electrically resistive sheet has a first, a second, and a third resistive zone between said ends of said electrically resistive sheet; wherein each zone has a length equal to one third of said length of said electrically resistive sheet; wherein said second zone is positioned between said first and third zones; wherein when a voltage is applied across said ends of said electrically resistive sheet, a quantity of heat is generated in each zone; wherein strands each having a width are present between openings, and wherein at least one of (i) the average width of the strands in each of said first and third resistive zones is less than the average width of the strands in said second electrically resistive zone such that said quantity of heat generated in each of said first and third zones is greater than said quantity of heat generated in said second zone, (ii) the number of current paths along the length of each of said first and third zones is greater than the number of current paths along the length of said second zone such that said quantity of heat generated in each of said first and third zones is greater than said quantity of heat generated in said second zone, or (iii) the average current path length along the length of each of said first and third zones is greater than the average current path length along the length of said second zone such that said quantity of heat generated in each of said first and third zones is greater than said quantity of heat generated in said second zone; and
(d) means for applying a voltage to said ends of said electrically resistive sheet such that a voltage is applied across said electrically resistive sheet sufficient to heat it above the combustion point of entrapped diesel exhaust particulate, said electrically resistive sheet being positioned such that when a voltage is applied across said electrically resistive sheet, sufficient heat is transferred from said sheet to soot particles entrapped in said filtering element such that said soot particles burn off.

20. The diesel particulate filter cartridge according to claim 19 wherein at least one of (i) the average width of the strands in each of said first and third electrically resistive zones is less than the average width of the strands in the second electrically resistive zone such that said quantity of heat generated in each of said first and third zones is at least 5 percent greater than said quantity of heat generated in said second zone, (ii) the number of current paths along the length of each of said first and third zones is greater than the number of current paths along the length of said second zone such that said quantity of heat generated in each of said first and third zones is at least 5 percent greater than said quantity of heat generated in said second zone, or (iii) the average current path length along the length of each of said first and third zones is greater than the average current path length along the length of said second zone such that said quantity of heat generated in each of said first and third zones is at least 5 percent greater than said quantity of heat generated in said second zone.

21. The diesel particulate filter cartridge according to claim 20 wherein said electrically resistive sheet is made of metal and said inorganic fiber is first ceramic oxide fiber.

22. The diesel particulate filter cartridge according to claim 21 further comprising a second filtering element of ceramic oxide fibers covering said openings of said electrically resistive sheet.

23. The diesel particulate filter cartridge according to claim 22 wherein said first filter element comprises material selected from the group consisting of helically wound ceramic oxide yarn, a woven fabric comprising ceramic oxide yarn, a nonwoven mat comprising ceramic oxide yarn, and combinations thereof, and wherein said second filter element comprises material selected from the group consisting of helically wound ceramic oxide yarn, a woven fabric comprising ceramic oxide yarn, a nonwoven mat comprising ceramic oxide yarn, and combinations thereof.

24. The diesel particulate filter cartridge according to claim 22 wherein said first ceramic oxide fiber is substantially helically cross-wound as first ceramic oxide yarn around said support member to cover said openings of said support member, wherein said first ceramic oxide yarn comprises a core from which a plurality of loops of continuous fibers, fiber segments or a combination thereof extend outwardly, wherein cores of successive convolutions of each successive layer are radially aligned to provide walls that are spaced to define four-sided openings, said walls providing stabilization to said first filtering element against exhaust forces, and wherein said plurality of loops of fibers, fiber segments or a combination thereof project into each of said four-sided openings, with said plurality of loops of fibers, fiber segments or a combination thereof of adjacent convolutions being intermeshed to provide with each of said four-sided openings a trap for diesel exhaust particulates, and wherein said support member has an imperforate area at each end thereof, and said cores of adjacent convolutions of said first yarn at said imperforate areas are spaced closely to provide relatively thick end walls that are substantially impervious to the flow of exhaust, and wherein said second ceramic oxide fiber is substantially helically cross-wound as second ceramic oxide yarn around said electrically resistive sheet to cover said openings of said support member, wherein said second ceramic oxide yarn comprises a core from which a second plurality of loops of continuous fibers, fiber segments or a combination thereof extend outwardly, wherein cores of successive convolutions of each successive layer are radially aligned to provide walls that are spaced to define four-sided openings, said walls providing stabilization to said second filtering element against exhaust forces, and wherein said second plurality of loops of fibers, fiber segments or a combination thereof project into each of said four-sided openings, with said second plurality of loops of fibers, fiber segments or a combination thereof of adjacent convolutions being intermeshed to provide with each of said four-sided openings a trap for diesel exhaust particulates, and wherein said electrically resistive sheet has an imperforate area at each end thereof, and cores of adjacent convolutions of said second yarn at said imperforate areas are spaced closely to provide relatively thick end walls that are substantially impervious to the flow of exhaust.

25. The diesel particulate filter cartridge according to claim 22 further comprising means for forcing exhaust gases to flow through said openings of said support member and said electrically resistive sheet.

26. A diesel particulate filter comprising:

(a) a casing having at least two ends;

(b) means for connecting said at least two ends of said casing to an exhaust system;

(c) means for supporting at least one diesel particulate filter cartridge; and (d) at least one diesel particulate filter cartridge according to claim 25, wherein said two ends of said support member extend between said at least two ends of said casing and being supported in said casing by said supporting means.

27. A diesel particulate filter cartridge comprising:

(a) a substantially rigid, hollow tubular support member having two ends and an outer surface with openings extending from said outer surface to an inner surface;

(b) a first filtering element comprising inorganic fiber covering said openings;

(c) an electrically resistive tube having an outer surface, a first end, a second end, openings extending from said outer surface to an inner surface, a length extending between said ends of said electrically resistive tube, and current paths extending across said length; wherein said electrically resistive tube has a first, a second, and a third resistive zone between said ends of said electrically resistive tube; wherein each zone has a length equal to one third of said length of said electrically resistive tube; wherein said second zone is positioned between said first and third zones; wherein when a voltage is applied across said ends of said electrically resistive tube, a quantity of heat is generated in each zone; and wherein strands each having a width are present between openings, and wherein at least one of (i) the average width of the strands in each of said first and third resistive zones is less than the average width of the strands in said second electrically resistive zone such that said quantity of heat generated in each of said first and third zones is greater than said quantity of heat generated in said second zone, (ii) the number of current paths along the length of each of said first and third zones is greater than the number of current paths along the length of said second zone such that said quantity of heat generated in each of said first and third zones is greater than said quantity of heat generated in said second zone, or (iii) the average current path length along the length of each of said first and third zones is at least 5 percent greater than the average current path length along the length of said second zone such that said quantity of heat generated in each of said first and third zones is greater than said quantity of heat generated in said second zone; and (d) means for applying a voltage to said ends of said electrically resistive tube such that a voltage is applied across said electrically resistive tube sufficient to heat it above the combustion point of entrapped diesel exhaust particulate, said electrically resistive tube being positioned such that when a voltage is applied across said electrically resistive tube, sufficient heat is transferred from said tube to soot particles entrapped in said first filtering element such that said soot particles burn off.

28. The diesel particulate filter cartridge according to claim 27 wherein at least one of (i) the average width of the strands in each of said first and third electrically resistive zones is less than the average width of the strands in the second electrically resistive zone such that said quantity of heat generated in each of said first and third zones is at least 5 percent greater than said quantity of heat generated in said second zone, (ii) the number of current paths along the length of each of said first and third zones is greater than the number of current paths along the length of said second zone such that said quantity of heat generated in each of said first and third zones is at least 5 percent greater than said quantity of heat generated in said second zone, or (iii) the average current path length along the length of each of said first and third zones is greater than the average current path length along the length of said second zone such that said quantity of heat generated in each of said first and third zones is at least 5 percent greater than said quantity of heat generated in said second zone.

29. The diesel particulate filter cartridge according to claim 28 wherein said electrically resistive tube is made of metal and said inorganic fiber is first ceramic oxide fiber.

30. The diesel particulate filter cartridge according to claim 29 further comprising a second filtering element of ceramic oxide fibers covering said openings of said electrically resistive tube.

31. The diesel particulate filter cartridge according to claim 30 wherein said first filter element comprises material selected from the group consisting of helically wound ceramic oxide yarn, a woven fabric comprising ceramic oxide yarn, a nonwoven mat comprising ceramic oxide yarn, and combinations thereof, and wherein said second filter element comprises material selected from the group consisting of helically wound ceramic oxide yarn, a woven fabric comprising ceramic oxide yarn, a nonwoven mat comprising ceramic oxide yarn, and combinations thereof.

32. The diesel particulate filter cartridge according to claim 30, wherein said first ceramic oxide fiber is substantially helically cross-wound as first ceramic oxide yarn around said support member to cover said openings of said support member, wherein said first ceramic oxide yarn comprises a core from which a plurality of loops of continuous fibers, fiber segments or a combination thereof extend outwardly, wherein cores of successive convolutions of each successive layer are radially aligned to provide walls that are spaced to define four-sided openings, said walls providing stabilization to said first filtering element against exhaust forces, and wherein said plurality of loops of fibers, fiber segments or a combination thereof project into each of said four-sided openings, with said plurality of loops of fibers, fiber segments or a combination thereof of adjacent convolutions being intermeshed to provide with each of said four-sided openings a trap for diesel exhaust particulates, and wherein said support member has an imperforate area at each end thereof, and cores of adjacent convolutions of said first yarn at said imperforate areas are spaced closely to provide relatively thick end walls that are substantially impervious to the flow of exhaust, and wherein said second ceramic oxide fiber is substantially helically cross-wound as second ceramic oxide yarn around said electrically resistive tube to cover said openings of said support member, wherein said second ceramic oxide yarn comprises a core from which a second plurality of loops of continuous fibers, fiber segments or a combination thereof extend outwardly, wherein cores of successive convolutions of each successive layer are radially aligned to provide walls that are spaced to define four-sided openings, said walls providing stabilization to said second filtering element against exhaust forces, and wherein said second plurality of loops of fibers, fiber segments or a combination thereof project into each of said four-sided openings, with said second plurality of loops of fibers, fiber segments or a combination thereof of adjacent convolutions being intermeshed to provide with each of said four-sided openings a trap for diesel exhaust particulates, and wherein said electrically resistive tube has an imperforate area at each end thereof, and cores of adjacent convolutions of said second yarn at said imperforate areas are spaced closely to provide relatively thick end walls that are substantially impervious to the flow of exhaust.

33. The diesel particulate filter cartridge according to claim 30 further comprising means for forcing exhaust gases to flow through said openings of said support member and said electrically resistive tube.

34. A diesel particulate filter comprising:

(a) a casing having at least two ends;

(b) means for connecting said at least two ends of said casing to an exhaust system;

(c) means for supporting at least one diesel particulate filter cartridge; and (d) at least one diesel particulate filter cartridge according to claim 33, wherein said two ends of said support member extend between said at least two ends of said casing and being supported in said casing by said supporting means.

* * * * *

UNITED STATES PATENT AND TRADEMARK OFFICE
CERTIFICATE OF CORRECTION

PATENT NO.   : 5,656,048
DATED        : August 12, 1997
INVENTOR(S)  : Mark P. Smith and Ryan C. Shirk It is certified that error appears in the above-identified patent and that said Letters Patent is hereby corrected as shown below:

Column 7,
Line 60, insert "is" after FIG. 5

Column 8,
Line 23, insert "is" after FIG. 18

Column 9,
Line 22, "Which" should read -- which --

Column 17,
Line 26, "lot" should read --(or--

Column 18,
Line 57, delete second occurrence "six"

Column 22,
Line 46, "elcetrically" should read -- electrically --

Column 25,
Line 17, "claim 1" should read -- claim 7 --

Signed and Sealed this

Thirtieth Day of October, 2001

Attest:

NICHOLAS P. GODICI
Acting Director of the United States Patent and Trademark Office

*Attesting Officer*